US012689700B2

(12) United States Patent (10) Patent No.: US 12,689,700 B2
Arimori et al. (45) Date of Patent: Jul. 21, 2026

(54) IMAGE READING DEVICE, AND CONTROL METHOD FOR IMAGE READING DEVICE CORRECTION CONTROL

(71) Applicant: SEIKO EPSON CORPORATION, Tokyo (JP)

(72) Inventors: Kazuhiko Arimori, Kitakyushu (JP); Makoto Wada, Kitakyushu (JP); Masaya Yamasaki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 18/494,473

(22) Filed: Oct. 25, 2023

(65) Prior Publication Data

US 2024/0146859 A1 May 2, 2024

(30) Foreign Application Priority Data

Oct. 26, 2022 (JP) ................................. 2022-171240

(51) Int. Cl.
| | |
|---|---|
| *H04N 1/00* | (2006.01) |
| *H04N 1/047* | (2006.01) |
| *H04N 1/053* | (2006.01) |
| *H04N 1/12* | (2006.01) |
| *H04N 1/387* | (2006.01) |

(52) U.S. Cl.
CPC ....... *H04N 1/3876* (2013.01); *H04N 1/00411* (2013.01); *H04N 1/0044* (2013.01); *H04N 1/0473* (2013.01); *H04N 1/053* (2013.01); *H04N 1/1215* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 2005/0254103 A1* | 11/2005 | Sugiyama | .............. | G03G 15/60 |
| | | | | 358/474 |
| 2006/0221358 A1* | 10/2006 | Takahashi | .......... | H04N 1/00472 |
| | | | | 358/1.1 |
| 2006/0285182 A1* | 12/2006 | Suzuki | ............... | H04N 1/00015 |
| | | | | 358/474 |
| 2013/0222819 A1* | 8/2013 | Johnson | ............. | G06K 15/1823 |
| | | | | 358/1.6 |
| 2014/0168725 A1* | 6/2014 | Yamamura | ......... | H04N 1/00015 |
| | | | | 358/475 |

(Continued)

FOREIGN PATENT DOCUMENTS

JP 2005-328216 A 11/2005

*Primary Examiner* — Abderrahim Merouan
*Assistant Examiner* — Pawan Dhingra
(74) *Attorney, Agent, or Firm* — WORKMAN NYDEGGER

(57) ABSTRACT

A control unit of an image reading device is configured to execute image correction control after performing a first reading operation of reading a medium while transporting the medium in a first direction, and the image correction control includes a second reading operation of reading the medium while transporting the medium in a second direction opposite to the first direction, and a combination process for combining a first area serving as a part of image data acquired through the first reading operation with a second area serving as a part of image data acquired through the second reading operation to acquire image data of one page.

20 Claims, 17 Drawing Sheets

(56)          References Cited

U.S. PATENT DOCUMENTS

| | | | | |
|---|---|---|---|---|
| 2014/0329194 A1* | 11/2014 | Sachdeva | ............... | A61C 7/002 |
| | | | | 433/24 |
| 2014/0347712 A1* | 11/2014 | Yoneyama | ......... | H04N 1/00816 |
| | | | | 358/498 |
| 2015/0166282 A1* | 6/2015 | Shirane | .................... | B65H 1/14 |
| | | | | 271/265.01 |
| 2015/0262045 A1* | 9/2015 | Arai | ........................ | G06K 15/14 |
| | | | | 358/1.2 |
| 2017/0078514 A1* | 3/2017 | Iwayama | ............... | H04N 1/107 |
| 2018/0213107 A1* | 7/2018 | Momose | .............. | H04N 1/3876 |
| 2020/0071103 A1* | 3/2020 | Tachi | ................... | H04N 1/3263 |
| 2020/0106906 A1* | 4/2020 | Mabara | ............. | H04N 1/00702 |
| 2020/0404118 A1* | 12/2020 | Hirayama | .............. | H04N 1/103 |
| 2021/0056716 A1* | 2/2021 | Mörwald | ............. | G01C 15/002 |
| 2023/0164277 A1* | 5/2023 | Nakagawa | ............. | H04N 1/121 |
| | | | | 358/400 |

\* cited by examiner

IMAGE READING DEVICE, AND CONTROL METHOD FOR IMAGE READING DEVICE CORRECTION CONTROL

The present application is based on, and claims priority from JP Application Serial Number 2022-171240, filed Oct. 26, 2022, the disclosure of which is hereby incorporated by reference herein in its entirety.

BACKGROUND

1. Technical Field

The present disclosure relates to an image reading device that reads an image of a medium. Further, the present disclosure relates to a control method for an image reading device.

2. Related Art

As a scanner which is an example of an image reading device, there is a sheet-feed type scanner which performs reading while transporting a document as a medium. Further, in such a sheet feed type scanner, an image reading means is provided to move toward and away from a sheet transporting surface as disclosed in JP-A-2005-328216, and the image reading means is configured to move toward and away from the sheet transporting surface according to a thickness of the sheet material.

A document to be read by the scanner is not limited to a sheet-like document, but may be, for example, a booklet-like document. In a booklet-like document, one page and the other page of a double-page spread may have different thicknesses. When such a booklet-like document is transported, the image reading means may move violently when the thickness of the document changes and cause a disturbance in the read image. Further, the aspect is not limited to such a booklet-like medium, and in a document having irregularities, steps, or the like in a thickness direction, the image reading means may move violently and cause a disturbance in a read image.

SUMMARY

An image reading device according to an aspect of the present disclosure for solving the problem is characterized by including: a first transport roller pair configured to transport a medium along a transport path for transporting the medium; a second transport roller pair located in a first direction with respect to the first transport roller pair on the transport path and configured to transport the medium; a reading unit located between the first transport roller pair and the second transport roller pair on the transport path and configured to read an image of the medium; and a control unit configured to control the first transport roller pair, the second transport roller pair, and the reading unit, wherein the reading unit is configured to be displaced toward and away from the transport path and is pressed toward the transport path, the control unit is configured to execute image correction control after performing a first reading operation of reading the medium while transporting the medium in the first direction, and the image correction control includes a second reading operation of reading the medium while transporting the medium in a second direction opposite to the first direction, and a combination process of combining a first area that is a part of image data acquired through the first reading operation with a second area that is a part of image data acquired through the second reading operation to acquire image data of one page.

Further, a control method for an image reading device of the present disclosure is a control method for an image reading device including a first transport roller pair configured to transport a medium along a transport path for transporting the medium, a second transport roller pair located in a first direction with respect to the first transport roller pair on the transport path and configured to transport the medium, and a reading unit located between the first transport roller pair and the second transport roller pair on the transport path and configured to read an image of the medium, the reading unit being configured to be displaced toward and away from the transport path and being pressed toward the transport path, the method including a first reading operation of reading the medium while transporting the medium in the first direction, a second reading operation of reading the medium while transporting the medium in a second direction opposite to the first direction, and a combination process of combining a first area that is a part of image data acquired through the first reading operation with a second area that is a part of image data acquired through the second reading operation to acquire image data of one page.

DESCRIPTION OF EMBODIMENTS

Figure 1:
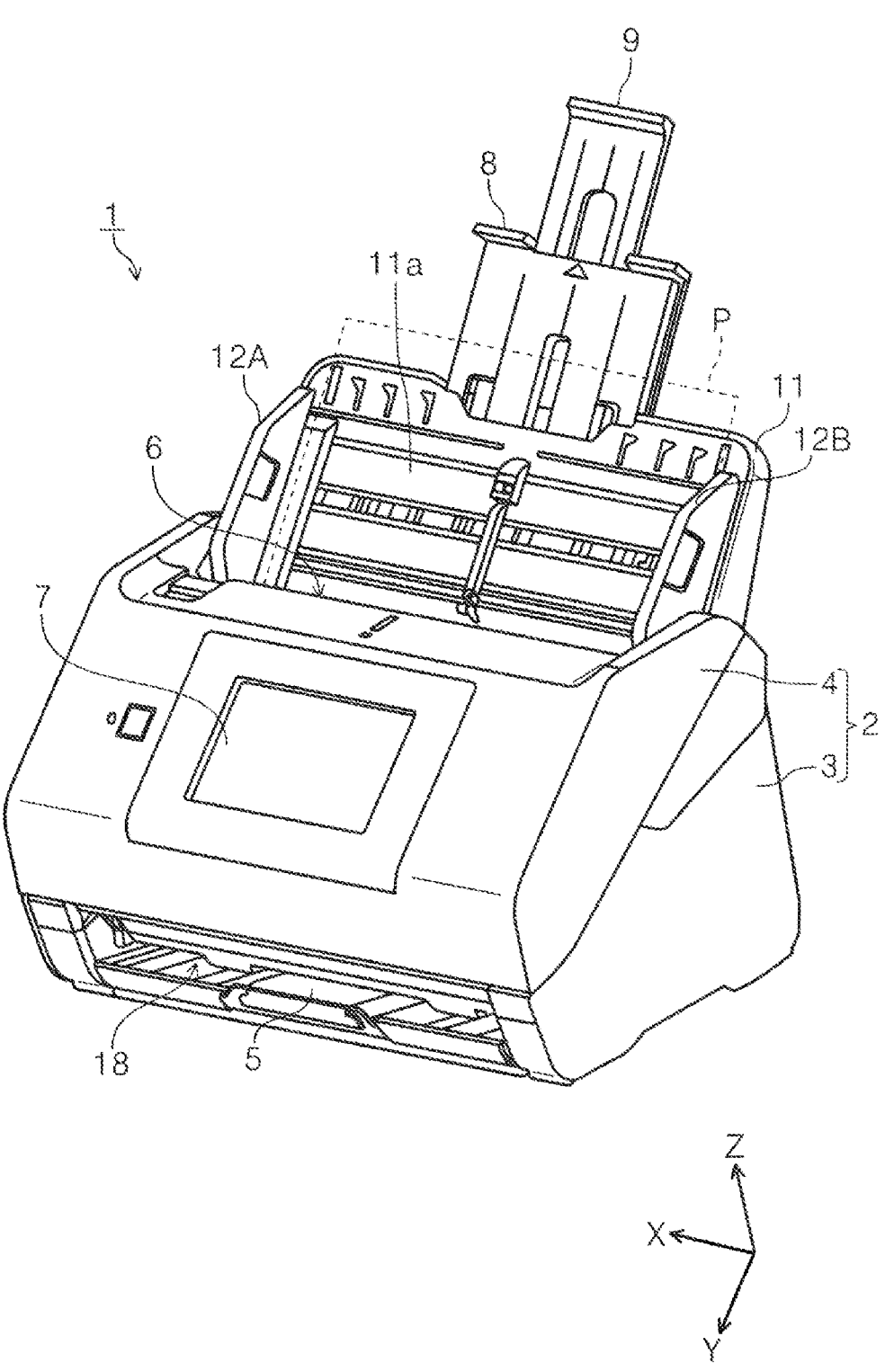
FIG. 1 is an external perspective view of a scanner.

Hereinafter, the present disclosure will be schematically described.

An image reading device according to a first aspect is characterized by including: a first transport roller pair configured to transport a medium along a transport path for transporting the medium; a second transport roller pair located in a first direction with respect to the first transport roller pair on the transport path and configured to transport the medium; a reading unit located between the first transport roller pair and the second transport roller pair on the transport path and configured to read an image of the medium; and a control unit configured to control the first transport roller pair, the second transport roller pair, and the reading unit, wherein the reading unit is configured to be displaced toward and away from the transport path and is pressed toward the transport path, the control unit is configured to execute image correction control after performing a first reading operation of reading the medium while transporting the medium in the first direction, and the image correction control includes a second reading operation of reading the medium while transporting the medium in a second direction opposite to the first direction, and a combination process of combining a first area that is a part of image data acquired through the first reading operation with a second area that is a part of image data acquired through the second reading operation to acquire image data of one page.

According to the present aspect, the control unit is configured to execute image correction control after performing a first reading operation of reading the medium while transporting the medium in the first direction. Since the image correction control includes a second reading operation of reading the medium while transporting the medium in a second direction opposite to the first direction, and a combination process of combining a first area that is a part of image data acquired through the first reading operation with a second area that is a part of image data acquired through the second reading operation to acquire image data of one page, it is possible to exclude an area in which an image disturbance has occurred through the combination process, and to acquire good image data of the one page.

The second aspect is characterized by including, in the first aspect: a DC motor, the DC motor being a driving source of the first transport roller pair and the second transport roller pair, wherein the control unit executes the image correction control when a load value indicating a load of the DC motor exceeds a threshold value during execution of the first reading operation.

When the load value indicating the load of the DC motor exceeds the threshold value, the reading unit is likely to move violently, and in such a case, the control unit executes the image correction control, making it possible to detect occurrence of an image disturbance using an existing means, and to curb an increase in cost of the device.

A third aspect is characterized in that, in the second aspect, the control unit determines the first area and the second area based on a timing at which the load value exceeds a threshold value.

According to the present aspect, since the control unit determines the first area and the second area based on a timing at which the load value exceeds a threshold value, it is possible to appropriately exclude a range in which the image disturbance occurs.

A fourth aspect is characterized by, in the first aspect, including: a medium detection unit configured to detect a medium in the second direction with respect to the first transport roller pair on the transport path, wherein the medium detection unit is an optical sensor including a light emission unit and a light reception unit, the control unit is configured to execute a first detection process of detecting a light reception intensity in the light reception unit when a light emission intensity of the detection light in the light emission unit is set as a first intensity; and a second detection process of detecting a light reception intensity in the light reception unit when the light emission intensity of the detection light in the light emission unit is set to a second intensity higher than the first intensity, and the control unit further acquires a difference R between a light reception intensity in the light reception unit in the first detection process and a light reception intensity in the light reception unit in the second detection process, and executes the image correction control when a difference between a maximum value and a minimum value of the difference R exceeds a threshold value.

When there are a first portion of the medium whose thickness is a first thickness and a second portion of the medium whose thickness is greater than the first thickness, the difference R in the light reception intensity in the light reception unit when the light emission intensity of the detection light in the light emission unit is changed is larger in the first portion than in the second portion. For this reason, when a difference between the minimum value and the maximum value of the difference R exceeds the threshold value, it can be said that a medium having a large change in thickness has passed through the medium detection unit, and there is high concern of an image disturbance occurring.

According to the present aspect, since a determination is made as to whether or not it is necessary to perform the image correction control using such a property, it is not necessary to provide a dedicated detection means for determining whether or not it is necessary to perform the image correction control, and it is possible to curb an increase in cost of the device.

A fifth aspect is characterized in that, in the first aspect, one of the two rollers constituting the first transport roller pair is a displacement roller configured to move toward and away from the other roller, the image reading device includes a displacement detection unit configured to detect a displacement of the displacement roller, and the control unit executes the image correction control when a displacement amount of the displacement roller exceeds a threshold value based on detection information of the displacement detection unit.

When the displacement amount of the displacement roller exceeds the threshold value, this means that a medium having a large change in thickness is transported. According to the present aspect, since the control unit performs the image correction control when the displacement amount of the displacement roller exceeds the threshold value based on the detection information of the displacement detection unit, it is possible to accurately determine whether or not it is necessary to perform the image correction control.

A sixth aspect is characterized by including, in the first aspect, a background plate serving as a portion read by the reading unit at a position facing the reading unit and being used for shading correction, wherein the reading unit and the background plate extend further outside than a medium having a maximum size in a width direction intersecting a transport direction of the medium, and the control unit reads the background plate during execution of the first reading operation, and executes the image correction control when an amount of change in luminance exceeds a threshold value.

When there are a first portion of the document whose thickness is a first thickness and a second portion of the document whose thickness is greater than the first thickness, luminance when the background plate is read differs between when the first portion passes and when the second portion passes. Therefore, when the change in luminance is large, this means that a medium having a large change in thickness has passed through the reading unit, and it can be said that there is high concern of an image disturbance occurring.

According to the present aspect, since a determination is made as to whether or not it is necessary to perform the image correction control using such a property, it is not necessary to provide a dedicated detection means for determining whether or not it is necessary to perform the image correction control, and it is possible to curb an increase in cost of the device.

A seventh aspect is characterized in that, in the first aspect, the control unit is configured to acquire information on a type of medium, types of the medium include a booklet, and the control unit executes the image correction control when the type of the medium is a booklet.

According to the present aspect, since the control unit is configured to acquire the information on the type of the medium and performs the image correction control when the type of the medium is a booklet, it is possible to reliably perform the image correction control when reading a booklet in which it is highly necessary to perform the image correction control.

An eighth aspect is characterized by, in the first aspect, including: a display unit configured to display an image, wherein the control unit is configured to execute a preview mode in which transport of the medium is temporarily stopped and an image of the medium read through the first reading operation is displayed on the display unit after execution of the first reading operation, and the control unit causes the display unit to display a user interface allowing a user to select whether to discharge the medium or to perform the image correction control in the preview mode.

According to the present aspect, since the control unit causes the display unit to display a user interface allowing a user to select whether to discharge the medium or to perform the image correction control in the preview mode, it is possible for the user to select whether to perform the image correction control, and it is possible to improve usability.

A ninth aspect is characterized in that, in the first aspect, the two rollers constituting the first transport roller pair are both driven by a drive source, and the two rollers constituting the second transport roller pair are both driven by the drive source.

According to the present aspect, since the two rollers constituting the first transport roller pair are both driven by a drive source, and the two rollers constituting the second transport roller pair are both driven by the drive source, transport force of the medium can be improved and disturbance of the read image due to a decrease in transport accuracy can be curbed.

The present aspect is not limited to the first aspect and may be applied to any one of the second to eighth aspects.

A tenth aspect is characterized in that, in the first aspect, one of the two rollers constituting the first transport roller pair that is on the same side as the reading unit with respect to the transport path is a displacement roller configured to move toward and away from the other roller, the displacement roller is provided with an engagement portion, the engagement portion being a portion displaced integrally with the displacement roller and being configured to engage with the reading unit, and when the displacement roller is separated from the other roller, the engaging portion displaces the reading unit together with the displacement roller.

According to the present aspect, when the displacement roller is separated from the other roller, the engagement portion displaces the reading unit together with the displacement roller, and thus, when the medium passes through the reading unit, a gap through which the medium passes when the medium passes through the reading unit becomes large, making it possible to curb a disturbance of the read image caused by the reading unit moving violently.

Further, the present aspect is not limited to the first aspect and may be applied to any one of the second to ninth aspects.

An eleventh aspect is characterized by, in the first aspect, further including: a guide unit configured to guide the medium transported in the first direction to a position facing the reading unit, in the second direction with respect to the reading unit on the transport path, wherein the guide unit is configured to be displaced toward and away from the transport path, and is provided integrally with the reading unit.

According to the present aspect, since the guide unit is configured to be displaced toward and away the transport path, and is provided integrally with the reading unit, a gap through which the medium passes when the medium passes through the reading unit becomes large, making it possible to curb a disturbance of the read image caused by the reading unit moving violently.

Further, the present aspect is not limited to the first aspect and may be applied to any one of the second to ninth aspects.

A control method for an image reading device according to a twelfth aspect is a control method for an image reading device including a first transport roller pair configured to transport a medium along a transport path for transporting the medium, a second transport roller pair located in a first direction with respect to the first transport roller pair on the transport path and configured to transport the medium, and a reading unit located between the first transport roller pair and the second transport roller pair on the transport path and configured to read an image of the medium, the reading unit being configured to be displaced toward and away from the transport path and being pressed toward the transport path, the method including a first reading operation of reading the medium while transporting the medium in the first direction, a second reading operation of reading the medium while transporting the medium in a second direction opposite to the first direction, and a combination process of combining a first area that is a part of image data acquired through the first reading operation with a second area that is a part of image data acquired through the second reading operation to acquire image data of one page.

According to the present aspect, since the method of controlling the image reading device includes the second reading operation of reading the medium while transporting the medium in a second direction opposite to the first direction after performing the first reading operation of reading the medium while transporting the medium in the first direction, and the combination process of combining a first area that is a part of image data acquired through the first reading operation with a second area that is a part of image data acquired through the second reading operation to acquire image data of one page, it is possible to exclude an area in which an image disturbance has occurred through the combination process, and to acquire good image data of the one page.

Hereinafter, the present disclosure will be specifically described.

Hereinafter, an embodiment of an image reading device will be described with reference to the drawings. In the present embodiment, an example of the image reading device is a document scanner (hereinafter, simply referred to as a scanner 1) capable of reading at least one surface of a front surface and a back surface of a document (hereinafter, referred to as a document P) which is an example of a medium.

In an XYZ coordinate system illustrated in each of drawings, an X-axis direction is a width direction of the device and a width direction of the document. A left direction when seen from a device front surface is a +X direction, and a right direction is a −X direction.

Further, a Y-axis direction is a document transport direction. In the present embodiment, the Y-axis direction is a direction intersecting a horizontal plane. A +Y direction in which the document P is transported is an example of a first direction, and a −Y direction opposite to the +Y direction is an example of a second direction.

Further, a Z-axis direction is a direction intersecting the Y-axis direction, and substantially indicates a direction orthogonal to a surface of the document being transported. A +Z direction is a direction including a vertically upward direction, and a −Z direction is a direction including a vertically downward direction.

Further, hereinafter, rotation directions of members will be described using directions Ka and Kb.

The scanner 1 includes a device body 2 including an upper reading sensor 20A and a lower reading sensor 20B (refer to FIG. 2) that reads an image of the document P therein.

The device body 2 is configured to include a lower unit 3 and an upper unit 4. The upper unit 4 is provided to be openable and closable by rotating with respect to the lower unit 3 with a rotational movement shaft 4b (refer to FIG. 2) downstream in the document transport direction as a rotation fulcrum. By rotating and opening the upper unit 4 to the front side of the device as indicated by reference sign 4-1 in FIG. 2, a document transport path of the document P is exposed, and the jam of the document P can be easily processed.

A document placement portion 11 having a placement surface 11a on which the document P to be fed is placed is provided near a rear surface of the device body 2. The document placement portion 11 is detachably provided in the device body 2.

Further, the document placement portion 11 is provided with a pair of left and right edge guides 12A and 12B that guide side edges of the document P in a width direction (X-axis direction) intersecting with the transport direction (Y-axis direction).

The document placement portion 11 includes a first paper support 8 and a second paper support 9. The first paper support 8 and the second paper support 9 are able to be housed inside the document placement portion 11, are configured to be able to be drawn out from the document placement portion 11 as illustrated in FIG. 1, and are able to adjust a length of the placement surface 11a.

The device body 2 includes, at the device front surface of the upper unit 4, an operation panel 7 in which a user interface (UI) that performs operations of various types of reading setting or reading executions, and shows a preview image of reading setting content, an image reading result, or the like is realized. In the present embodiment, the operation panel 7 is a so-called touch panel that enables both display and input, and serves as both an operation unit for performance of various operations and a display unit for displaying various types of information.

A feeding port 6 communicating with an inside of the device body 2 is provided at an upper portion of the upper unit 4, and the document P placed on the document placement portion 11 is fed from the feeding port 6 to the inside the device body 2.

Further, a paper discharge tray 5 for receiving the document P to be discharged is provided at the device front side of the lower unit 3.

Next, the document transport path in the scanner 1 will be described with main reference to FIG. 2.

Figure 2:
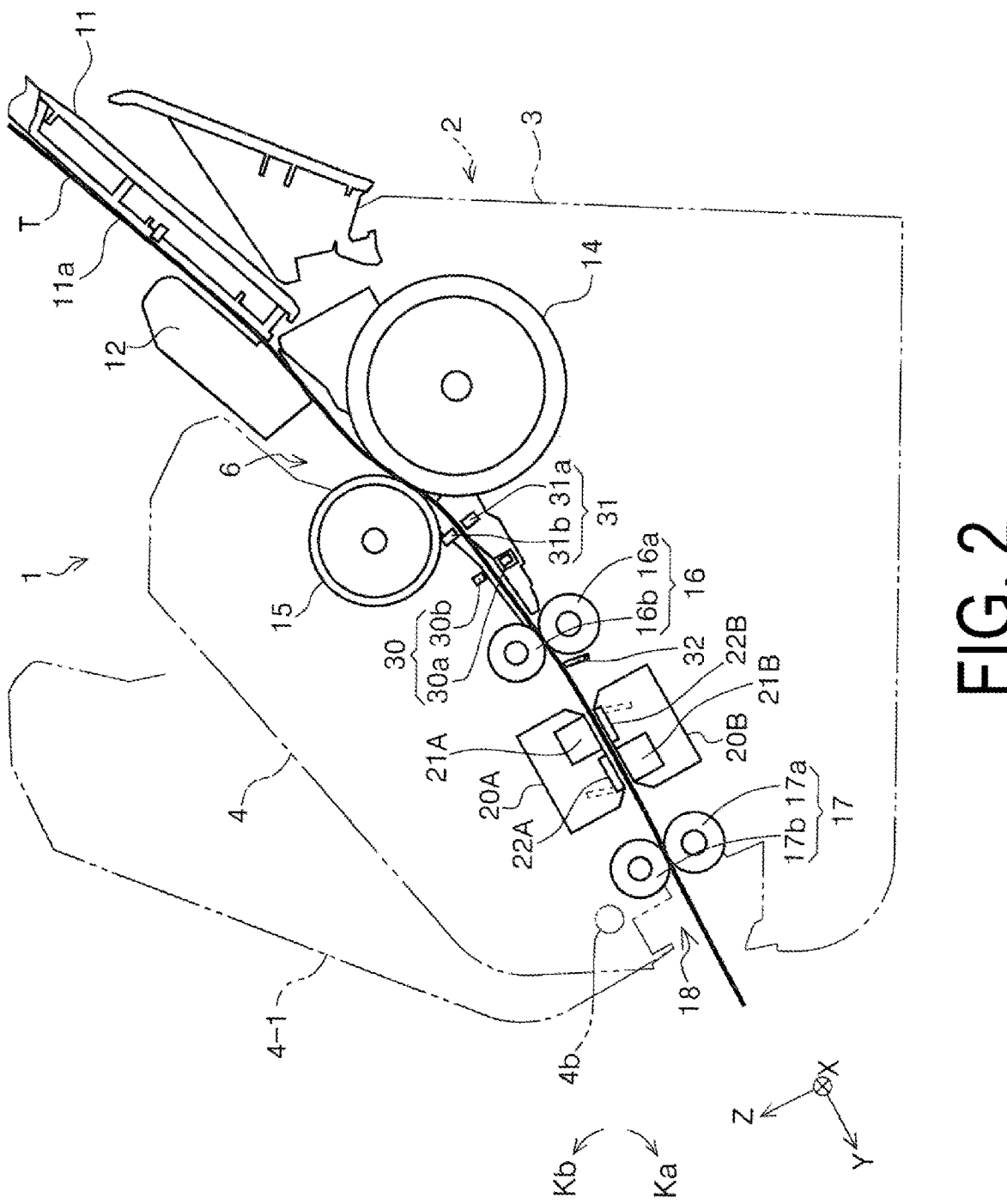
FIG. 2 is a diagram illustrating a document transport path in the scanner.

In FIG. 2, a solid line denoted by a reference sign T indicates the document transport path (in other words, a passing track of the document P). A document transport path T is a space sandwiched between the lower unit 3 and the upper unit 4.

The document placement portion 11 is provided on an uppermost stream of the document transport path T, and a document feed roller 14 that feeds the document P placed on the placement surface 11a of the document placement portion 11 in the +Y direction, and a separation roller 15 that nips the document P with the document feed roller 14 and separates the document P are provided on the downstream of the document placement portion 11.

The feed roller 14 comes into contact with the lowermost document P among the documents P placed on the placement surface 11a of the document placement portion 11. Therefore, when the plurality of documents P are set on the document placement portion 11 in the scanner 1, the documents P are sequentially fed downstream from the document P on the placement surface 11a side.

Figure 3:
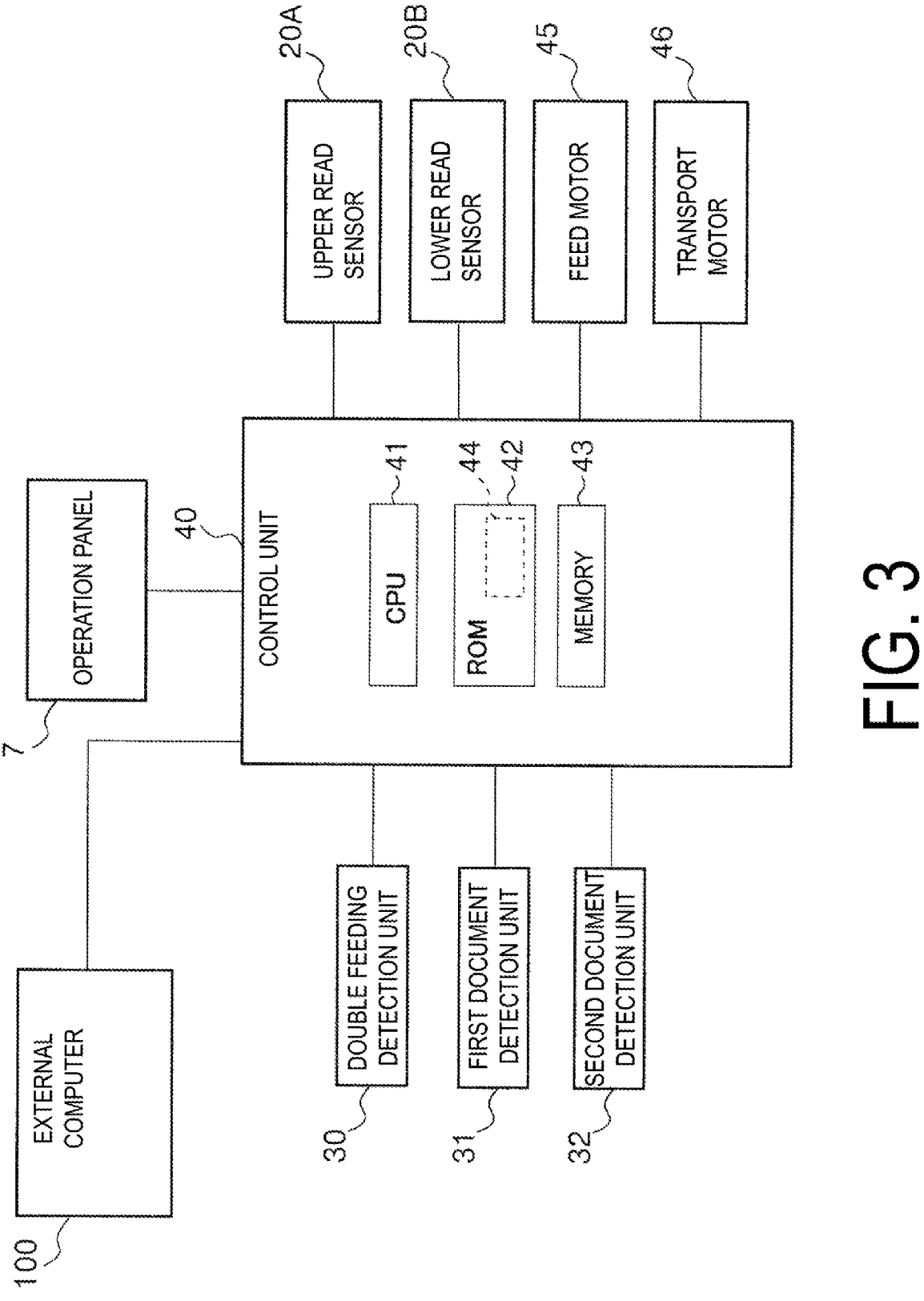
FIG. 3 is a block diagram illustrating a control system of the scanner.

The feed roller 14 is rotationally driven by a feed motor 45 (refer to FIG. 3). The feed roller 14 receives a rotation torque from the feed motor 45 and rotates in the direction Kb.

The rotation torque in the direction Kb is transferred to the separation roller 15 from a transport motor 46 (refer to FIG. 3) via a torque limiter (not illustrated).

When no document P is interposed between the feed roller 14 and the separation roller 15, or when only one document is interposed, the separation roller 15 is driven to rotate in the direction Ka regardless of the rotation torque received from the transport motor 46 by slippage occurring in a torque limiter (not shown).

When the second and subsequent documents P further enter between the feed roller 14 and the separation roller 15 in addition to the document P to be fed, slippage occurs between the documents, so that the separation roller 15 rotates in the direction Kb due to the rotation torque received from the transport motor 46, the second and subsequent documents P are returned upstream, and double feeding is prevented.

When a booklet that is a document in which a plurality of sheets are stacked is fed, power transmission from the transport motor 46 to the separation roller 15 is cut off by a power switching means (not illustrated).

A first transport roller pair 16 is provided downstream of the feed roller 14. The first transport roller pair 16 includes a lower first roller 16a that is rotationally driven by the transport motor 46 (refer to FIG. 3), and an upper first roller 16*b* that is rotationally driven by the transport motor 46 (refer to FIG. 3). When the document P is transported in the +Y direction, the lower first roller 16*a* is rotationally driven in the direction Ka, and the upper first roller 16*b* is rotationally driven in the direction Ka. Further, when the document P is transported in the −Y direction, the lower first roller 16*a* is rotationally driven in the direction Ka, and the upper first roller 16*b* is rotationally driven in the direction Kb.

The document P fed by the feed roller 14 is nipped by the first transport roller pair 16 and transported to the upper reading sensor 20A and the lower reading sensor 20B located downstream of the first transport roller pair 16.

The first document detection unit 31 is provided downstream the feed roller 14. The first document detection unit 31 is configured as an optical sensor as an example, and includes a light emission unit 31*a* and a light reception unit 31*b* which are disposed to face each other with the document transport path T interposed therebetween. The light reception unit 31*b* transmits an electrical signal indicating the intensity of the detection light to the control unit 40 (refer to FIG. 3). When the transported document P blocks the detection light emitted from the light emission unit 31*a*, the electrical signal indicating the intensity of the detection light changes, and thus the control unit 40 can detect passage of a leading edge or a trailing edge of the document P.

As will be described in detail later, the control unit 40 can determine the thicknesses of the document P by changing the intensity of the detection light emitted from the light emission unit 31*a*.

The multi-feed detection unit 30 that detects multi-feed of the document P is disposed downstream the first document detection unit 31. The multi-feed detection unit 30 includes an ultrasonic transmission unit 30*a* and an ultrasonic reception unit 30*b* for receiving an ultrasonic wave that are disposed to face each other with the document transport path T interposed therebetween, and the ultrasonic reception unit 30*b* transmits an electrical signal indicating the intensity of the detected ultrasonic waves to the control unit 40 (refer to FIG. 3). When multi-feed of the document P occurs, an electrical signal indicating the intensity of the ultrasonic waves changes, and thus the control unit 40 can detect the multi-feed of the document P.

Further, a second document detection unit 32 is provided downstream the multi-feed detection unit 30. The second document detection unit 32 is configured as a contact type sensor having a lever, and when the lever rotates with passage of the leading edge or the trailing edge of the document P, an electrical signal sent from the second document detection unit 32 to the control unit 40 (refer to FIG. 3) changes so that the control unit 40 can detect the passage of the leading edge or the trailing edge of the document P.

The control unit 40 can ascertain a position or length of the document P in the document transport path T using the first document detection unit 31 or the second document detection unit 32 described above.

The upper reading sensor 20A and the lower reading sensor 20B are disposed to face each other on the downstream of the second document detection unit 32. The upper reading sensor 20A is provided on the upper unit 4 and the lower reading sensor 20B is provided on the lower unit 3.

The lower reading sensor 20B reads, a lower surface of the document P, that is, the first surface, and the upper reading sensor 20A reads an upper surface, that is, the second surface of the document P.

The upper reading sensor 20A includes an image sensor 21A, and the lower reading sensor 20B includes an image sensor 21B. The image sensors 21A and 21B are contact type image sensor modules (CISM) in the present embodiment.

The lower reading sensor 20B includes a background plate 22B at a position facing the upper image sensor 21A, and the upper reading sensor 20A includes a background plate 22A at a position facing the lower image sensor 21B.

The background plate 22B and the background plate 22A are reference plates that are read by an opposing image sensor for shading correction, and for example, a resin plate of white, gray, black or the like or a metal plate coated with white, gray, black or the like can be used.

The background plate 22B and the background plate 22A are provided to be rotatable by power of a power source (not illustrated), and can switch between a facing state (solid line in FIG. 2) with the opposing image sensor and a non-facing state (a broken line in FIG. 2) through the rotation. In the present embodiment, the background plate 22B and the background plate 22A form white as an example, and can acquire a white reference value in a facing state, and can acquire a black reference value in a non-facing state.

After an image of at least one of a first surface and a second surface of the document P is read, the document P is nipped by the second transport roller pair 17 and is discharged from a discharge port 18 provided on the device front surface side of the lower unit 3.

The second transport roller pair 17 includes a lower second roller 17*a* that is rotationally driven by a transport motor 46 (refer to FIG. 3) and an upper second roller 17*b* that is rotationally driven by the transport motor 46 (refer to FIG. 3).

When the document P is transported in the +Y direction, the lower second roller 17*a* is rotationally driven in the direction Kb, and the upper second roller 17*b* is rotationally driven in the direction Ka. Further, when the document P is transported in the −Y direction, the lower second roller 17*a* is rotationally driven in the direction Ka, and the upper second roller 17*b* is rotationally driven in the direction Kb.

Next, a control system in the scanner 1 will be described with reference to FIG. 3. FIG. 3 is a block diagram illustrating the control system of the scanner 1 according to the present disclosure.

In FIG. 3, the control unit 40 serving as a control means performs various other controls of the scanner 1, including document P feeding control and reading control. A signal from the operation panel 7 is input to the control unit 40, and a signal for realizing a display of the operation panel 7, particularly, a user interface (UI) is transmitted from the control unit 40 to the operation panel 7.

The control unit 40 controls the feed motor 45 and the transport motor 46. As described above, the feed motor 45 is a power source of the feed roller 14, and the transport motor 46 is a power source of the separation roller 15, the first transport roller pair 16, and the second transport roller pair 17. In the present embodiment, both the feed motor 45 and the transport motor 46 are DC motors.

Information read from the upper reading sensor 20A and the lower reading sensor 20B is input to the control unit 40, and the control unit 40 generates image data based on the information. Further, the control unit 40 transmits signals for controlling the upper reading sensor 20A and the lower reading sensor 20B to the upper reading sensor 20A and the lower reading sensor 20B.

Detection signals are input to the control unit 40 from detection means of the multi-feed detection unit 30, the first document detection unit 31, and the second document detection unit 32, and the control unit 40 performs necessary control based on these detection signals.

The control unit 40 includes a CPU 41, a ROM 42, and a memory 43. The CPU 41 performs various arithmetic processes according to the program 44 stored in the ROM 42 and controls an operation of the entire scanner 1. The memory 43, which is an example of a storage unit, is a readable and writable nonvolatile memory, and stores setting information and the like input via the operation panel 7.

Various controls to be described below are implemented by the CPU 41 executing the program 44.

Further, the scanner 1 is configured to be coupled to an external computer 100. Information is input from the external computer 100 to the control unit 40, and the control unit 40 performs necessary control based on the information.

Next, a configuration of the first transport roller pair 16, the second transport roller pair 17, and the upper reading sensor 20A will be further described with reference to FIG. 4.

The upper reading sensor 20A is an example of a reading unit which is displaceable in the Z-axis direction, that is, toward and away from the document transport path T, and is pressed toward the document transport path T by a spring 24 which is an example of a pressing member.

In the upper reading sensor 20A and the lower reading sensor 20B, a guide surface U1 that guides the document P transported in the +Y direction to between the upper reading sensor 20A and the lower reading sensor 20B is formed at a corner portion in the −Y direction. Similarly, in the upper reading sensor 20A and the lower reading sensor 20B, a guide surface U2 that guides the document P transported in the −Y direction to between the upper reading sensor 20A and the lower reading sensor 20B is formed at a corner portion in the +Y direction.

The upper first roller 16b, which is one of the two rollers that constitute the first transport roller pair 16 and is located on the same side of the document transport path T as the upper reading sensor 20A is provided to be able to move toward and away from the lower first roller 16a. The upper first roller 16b is pressed toward the lower first roller 16a by a spring 23, which is an example of a pressing member.

Similarly, the upper second roller 17b, which is one of the two rollers constituting the second transport roller pair 17 and is located on the same side as the upper reading sensor 20A with respect to the document transport path T is provided to be able to move toward and away from the lower second roller 17a which is the other roller. The upper second roller 17b is pressed toward the lower second roller 17a by a spring 25, which is an example of a pressing member.

When the document P is transported to the first transport roller pair 16 from the −Y direction to the +Y direction, the document P pushes up the upper first roller 16b in the +Z direction against the spring force of the spring 23. Next, the document P pushes up the upper reading sensor 20A in the +Z direction against the spring force of the spring 24. Further, the document P pushes up the upper second roller 17b in the +Z direction against the spring force of the spring 25.

Similarly, when the document P is transported from the +Y direction to the −Y direction with respect to the second transport roller pair 17, the document P pushes up the upper second roller 17b in the +Z direction against the spring force of the spring 25. Next, the document P pushes up the upper reading sensor 20A in the +Z direction against the spring force of the spring 24. Further, the document P pushes up the upper first roller 16b in the +Z direction against the spring force of the spring 23.

Thus, when the document P passes between the upper reading sensor 20A and the lower reading sensor 20B, the upper reading sensor 20A is pushed up in the +Z direction against the spring force of the spring 24, and thus, when the upper reading sensor 20A is greatly pushed up in the +Z direction or greatly lowered in the −Z direction during the reading operation, the upper reading sensor 20A may move violently and cause a disturbance in the read image.

The control unit 40 can execute image correction control, which will be described later, in view of such problems.

Figure 4:
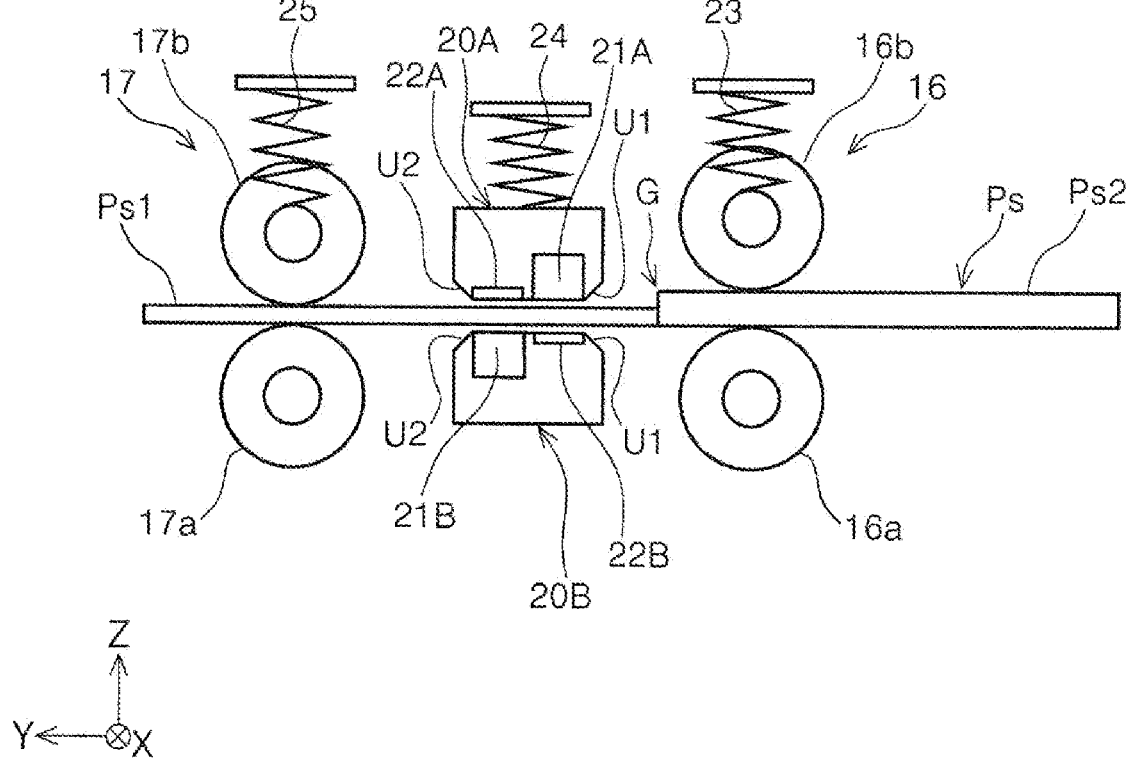
FIG. 4 is a diagram illustrating details of configurations of a first transport roller pair, a second transport roller pair, and an upper reading sensor.

In FIG. 4, reference sign Ps denotes a booklet which is an example of the document P. A reference numeral Ps1 denotes a page in the +Y direction of one page of the double-page spread of the booklet Ps, a reference sign Ps2 denotes a page in the −Y direction of one page of the double-page spread, and a step G is present between the page Ps1 and the page Ps2. When the thicknesses on the page Ps1 side and the page Ps2 side are the same, there is little or no step G, but the step G becomes larger as the thicknesses on the page Ps1 side and the page Ps2 side are different. Further, even when the thicknesses of the page Ps1 side and the page Ps2 side are the same, a portion of a back cover of the booklet Ps may become the step G. When such a step G enters between the upper reading sensor 20A and the lower reading sensor 20B or when the step G exits between the upper reading sensor 20A and the lower reading sensor 20B, the upper reading sensor 20A may move violently and the read image may be disturbed.

In the present embodiment, since the lower reading sensor 20B is fixedly provided, the disturbance of the read image described above hardly occurs on the surface to be read by the lower reading sensor 20B.

Figure 5:
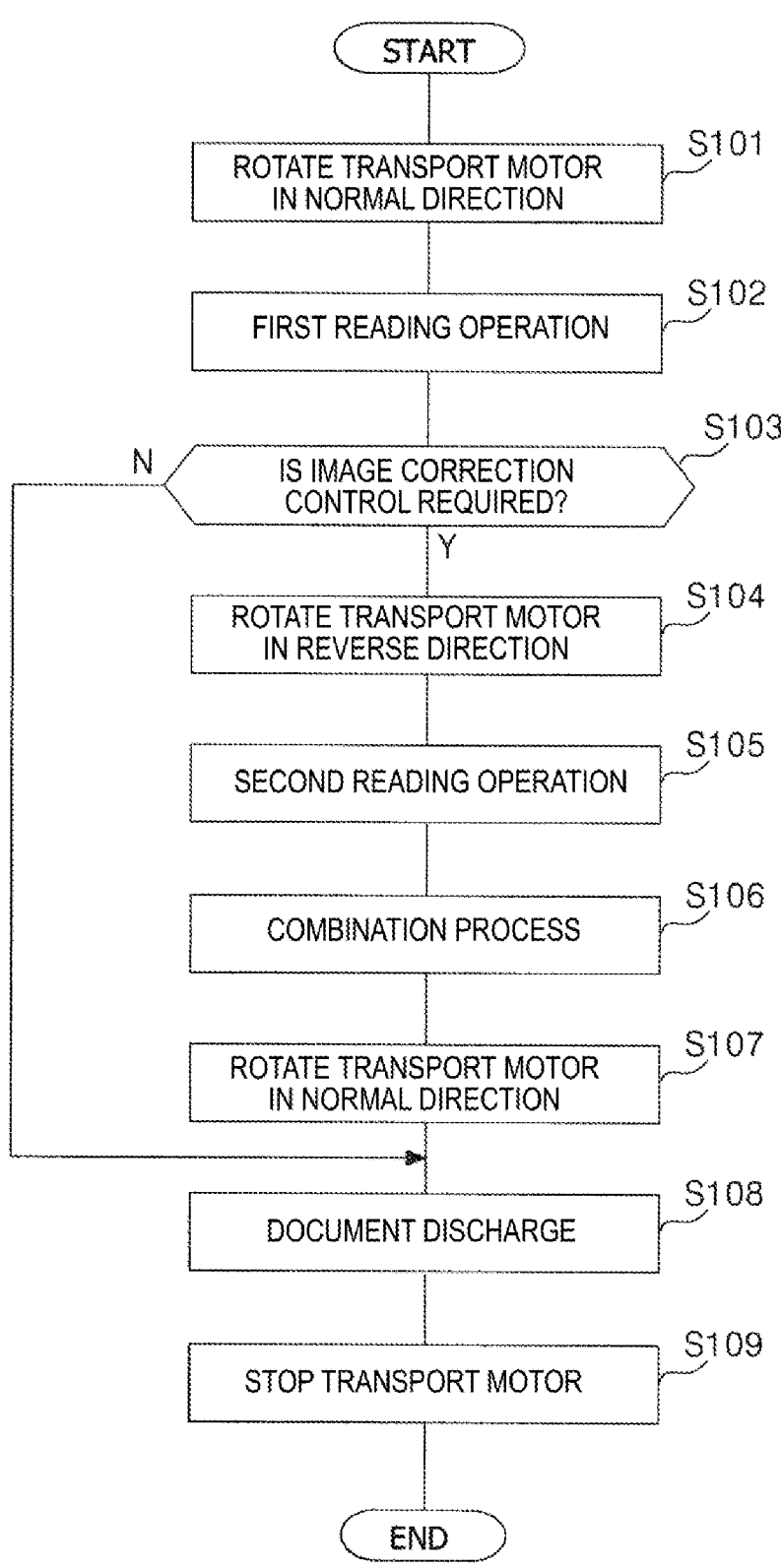
FIG. 5 is a flowchart illustrating control executed by a control unit.

FIG. 5 shows control executed by the control unit 40. Hereinafter, as an example, the document P to be transported is referred to as a booklet Ps. In FIG. 5, illustration of control of the feed roller 14 or the separation roller 15 is omitted.

When a reading execution command is received, the control unit 40 rotates the transport motor 46 in a normal direction (step S101). Thus, the booklet Ps is transported in the +Y direction. The control unit 40 performs the reading operation while rotating the transport motor 46 in the normal direction (step S102). This reading operation is referred to as a first reading operation.

Figure 7:
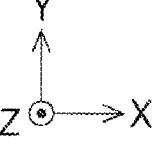
FIG. 7 is a diagram illustrating an example of an image area read in a first reading operation.
Figure 7:
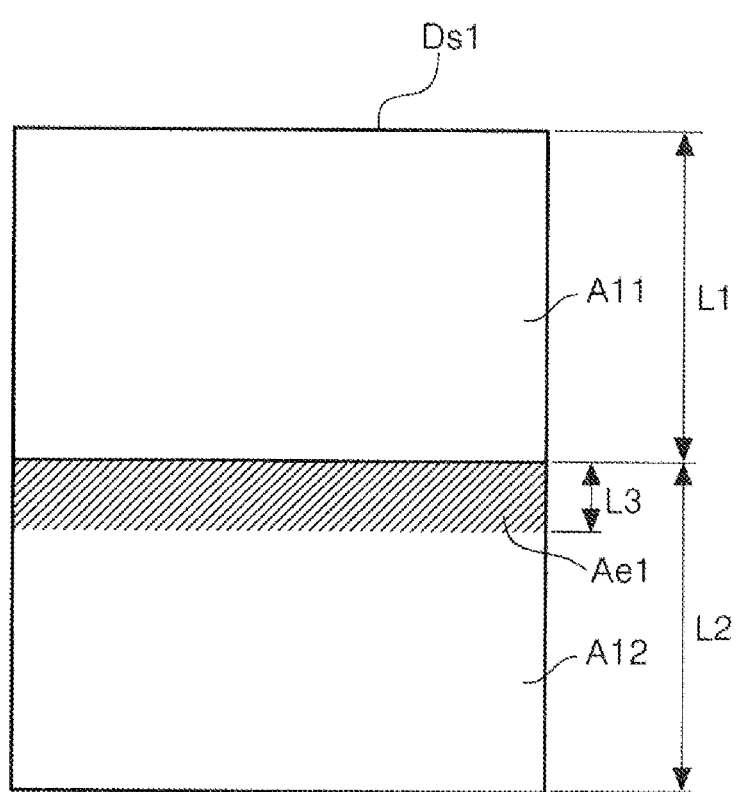

FIG. 7 illustrates an area of an image generated based on the image data transmitted from the upper reading sensor 20A in the first reading operation, and reference sign Ds1 indicates an image area of one page of the double-page spread of the booklet Ps. The image area Ds1 is formed of image data. In the following description, the image area and the image data are treated as having the same meaning. For example, it is assumed that the image area Ds1 may be rephrased as the image data Ds1.

A reference sign A11 denotes an image area when the page Ps1 in the +Y direction of one page of the double-page spread of the booklet Ps is read through the first reading operation (step S102). Further, a reference numeral A12 denotes an image area when the page Ps2 in the −Y direction of one page of the double-page spread of the booklet Ps is read through the first reading operation (step S102).

Since the step G is present between the page Ps1 and the page Ps2 as described above (refer to FIG. 4), the image area A12 includes an image disturbance area Ae1 caused by the violent movement of the upper reading sensor 20A described above.

Returning to FIG. 5, when it is not necessary to execute the image correction control (No in Step S103), the control unit 40 discharges the booklet Ps as it is (step S108) and stops the transport motor 46 (step S109). When it is necessary to execute the image correction control (Yes in step S103), the process proceeds to step S104.

A specific example of the determination of necessity of execution of the image correction control will be described later.

In the present embodiment, steps S104 to S106 constitute the image correction control.

First, the control unit 40 rotates the transport motor 46 in the reverse direction in a state in which an end portion of the booklet Ps in the −Y direction is positioned between the upper reading sensor 20A and the second transport roller pair 17 (step S104). Thus, the booklet Ps is transported (reversely transported) in the −Y direction. The control unit 40 performs the reading operation while transporting the booklet Ps in the −Y direction (step S105). This reading operation is referred to as a second reading operation.

Figure 8:
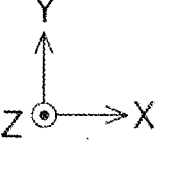
FIG. 8 is a diagram illustrating an example of an image area read in a second reading operation.
Figure 8:
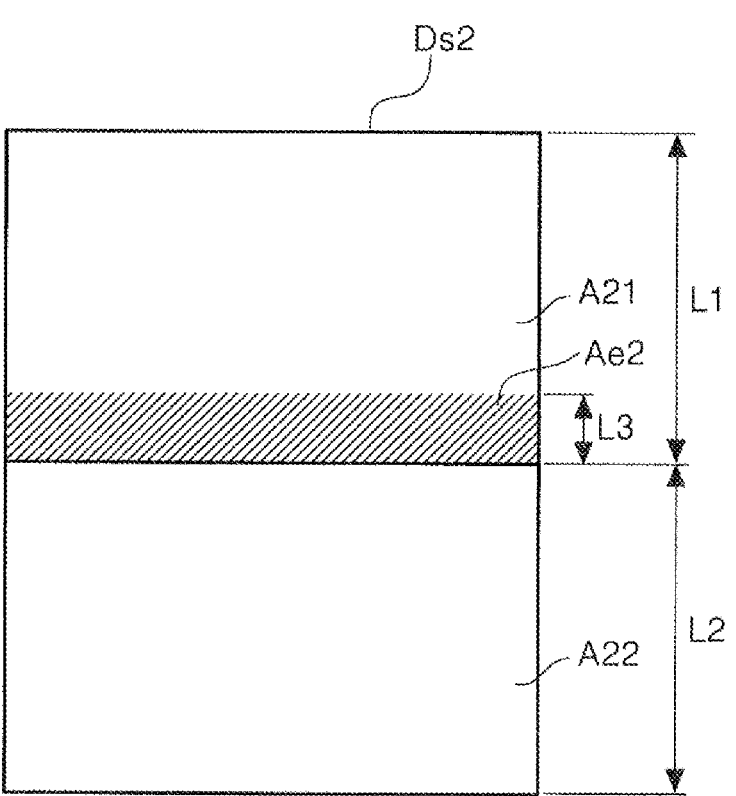

FIG. 8 illustrates an area of an image generated based on the image data transmitted from the upper reading sensor 20A in the second reading operation, and a reference sign Ds2 indicates an image area of one entire page of the double-page spread of the booklet Ps. The image area Ds2 is formed by using image information.

A reference sign A21 is an image area when a page Ps1 in the +Y direction of one page of the double-page spread of the booklet Ps is read through the second reading operation (step S105). Further, a reference numeral A22 denotes an image area when the page Ps2 in the −Y direction of one page of the double-page spread of the booklet Ps is read through the second reading operation (step S105).

Since the step G is present between the page Ps1 and the page Ps2 as described above (refer to FIG. 4), the image area A21 includes an image disturbance area Ae2 caused by the violent movement of the upper reading sensor 20A described above.

Referring back to FIG. 5, after the control unit 40 executes the second reading operation (step S105), the control unit 40 performs an image data combination process (step S106). The combination process is a process of combining a first area which is a part of the image data acquired through the first reading operation with a second area which is a part of the image data acquired through the second reading operation to acquire image data of one page.

Figure 9:
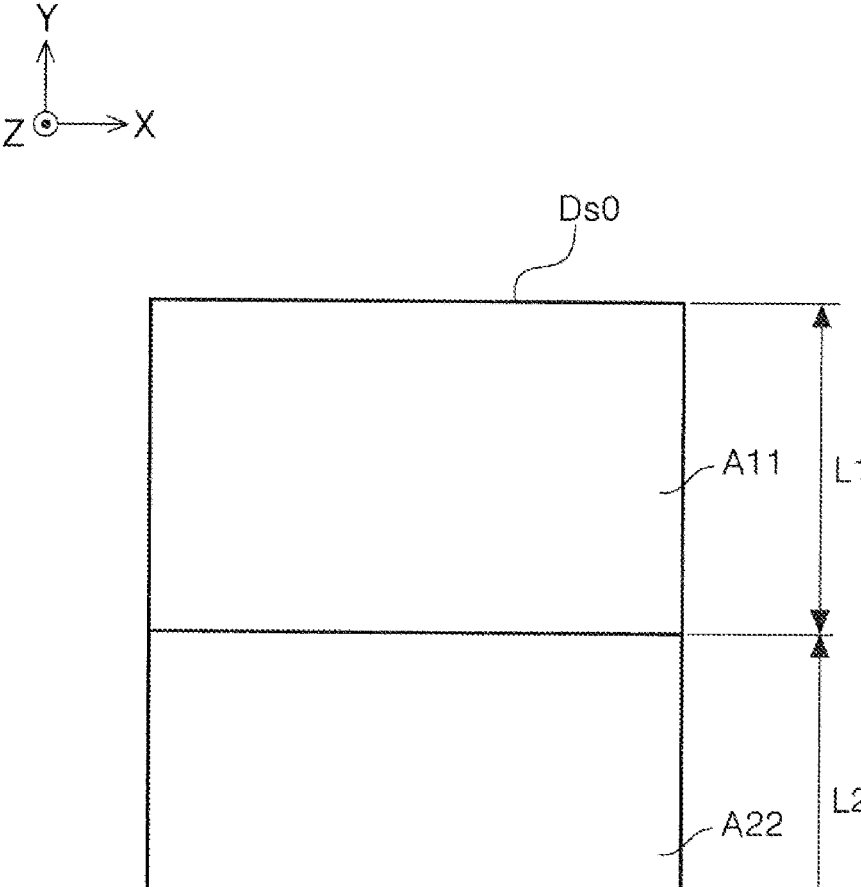
FIG. 9 is a diagram illustrating an example of an image area subjected to a combination process.

In the combination process, as an example, the image area A11 (refer to FIG. 7) which is a part of the image acquired through the first reading operation is set as the first area, the image area A22 (refer to FIG. 8) which is a part of the image acquired through the second reading operation is set as the second area, and the image area A11 is combined with the image area A22 so that the image area Ds0 is generated as illustrated in FIG. 9. This makes it possible to exclude the image disturbance area Ae1 illustrated in FIG. 7 or the image disturbance area Ae2 illustrated in FIG. 8 and obtain a favorable image area Ds0 of one page of the double-page spread.

It will be obvious that the above-described combination process is an example, and various methods can be adopted. For example, an area obtained by excluding the image disturbance area Ae1 from the image area Ds1 (refer to FIG. 7) acquired through the first reading operation may be set as a first area, and an area corresponding to the image disturbance area Ae1 in the image area Ds2 (refer to FIG. 8) acquired through the second reading operation may be set as a second area, and the first area and the second area may be combined.

Further, similarly, an area corresponding to the image disturbance area Ae2 of the image area Ds2 (refer to FIG. 8) acquired through the second reading operation in the image area Ds1 (refer to FIG. 7) acquired through the first reading operation may be set as a first area, an area obtained by excluding the image disturbance area Ae2 from the image area Ds2 (refer to FIG. 8) acquired through the second reading operation may be set as a second area, and the first area and the second area may be combined.

As described above, the first area may be an area continuous in the Y direction or an area not continuous in the Y direction, and the second area may also be an area continuous in the Y direction or an area not continuous in the Y direction.

Further, the image disturbance areas Ae1 and Ae2 may be areas including a normal reading area to some extent in the +Y direction and the −Y direction and having a margin.

Figure 6:
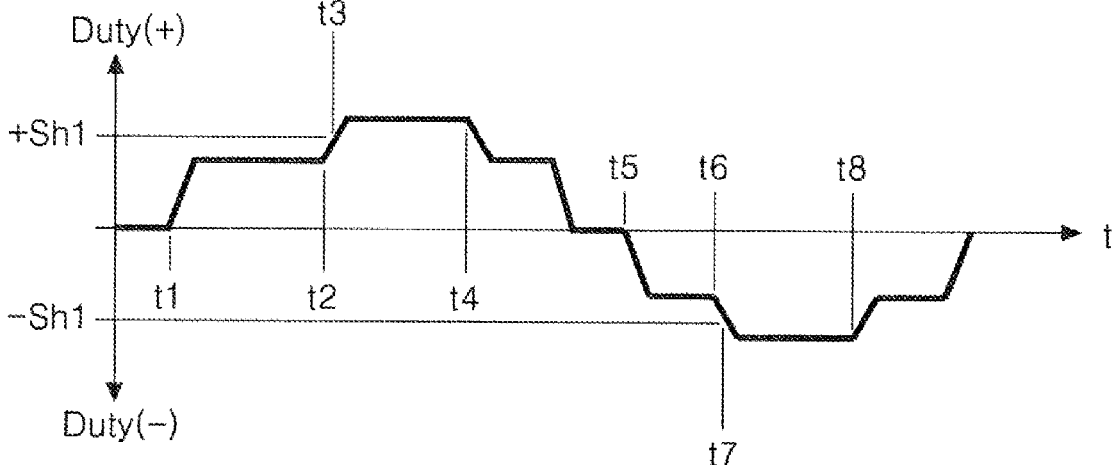
FIG. 6 is a chart showing an example of a change in duty cycle.

Next, an example of a method of determining positions and sizes of the image disturbance areas Ae1 and Ae2 will be described with reference to FIG. 6. In FIG. 6, a vertical axis indicates a duty cycle of a pulse signal applied to the transport motor 46 by the control unit 40, and for convenience, a duty cycle when forward rotation driving of the transport motor 46 is performed is represented by Duty (+) and a duty cycle when backward rotation driving of the transport motor 46 is performed is represented by Duty (−). Further, +Sh1 is a threshold value of the duty cycle when forward rotation driving of the transport motor 46 is performed, and −Sh1 is a threshold value of the duty cycle when backward rotation driving of the transport motor 46 is performed. In the present embodiment, absolute values of the thresholds +Sh1 and −Sh1 are the same, and are hereinafter referred to as a first threshold value Sh1.

When a determination is made that the document is jammed when the duty cycle exceeds a jam threshold value and control for stopping the document transport is adopted, the first threshold value Sh1 is set to a value smaller than the jam threshold value.

Here, the duty cycle will be described. The control unit 40 performs feedback control so that the number of rotations (rotational speed) of the transport motor 46 reaches a predetermined target speed based on a detection signal output from a rotary encoder (not shown) provided in the transport motor 46. The feedback control adopted here is, for example, PID control. In this case, the control unit 40 performs pulse width modulation (PWM) on the pulse signal applied to the transport motor 46, thereby adjusting a current input to the transport motor 46 and controlling a rotation speed of the transport motor 46.

The duty cycle refers to a proportion of an ON period in one cycle of the pulse signal subjected to PWM described above. When a load for driving the first transport roller pair 16 or the second transport roller pair 17 increases during the transport of the document, the duty cycle also increases under the feedback control. Therefore, the duty cycle is an example of a load value indicating a load at the time of driving the first transport roller pair 16 or the second transport roller pair 17.

At a timing t1 in FIG. 6, the forward rotation driving of the transport motor 46 is started. The booklet Ps is transported in the +Y direction, the step G enters between the upper reading sensor 20A and the lower reading sensor 20B at a timing t2, and the duty cycle exceeds the first threshold value Sh1 at a timing t3. Next, at a timing t4, the step G of the booklet Ps comes out from between the upper reading sensor 20A and the lower reading sensor 20B.

In this case, the image disturbance area Ae1 (refer to FIG. 7) in the first reading operation occurs in a predetermined period after the timing t2 at which the duty cycle starts to increase. Here, the predetermined period can be obtained through an experiment in advance, and can be stored in a storage unit such as the memory 43 (refer to FIG. 3) and read. As an example, the image disturbance area Ae1 may be an image datum from the timing t2 as a starting point to a time when a predetermined time elapses.

Therefore, a position and size of the image disturbance area Ae1 in the image area Ds1 (refer to FIG. 7) can be ascertained based on the position (a position in the document transport path T) and size of the booklet Ps ascertained from the detection information of the second document detection unit 32 (refer to FIG. 2) and the driving amount of the transport motor 46, and the change in the duty cycle.

When the image correction control is to be performed, the backward rotation driving of the transport motor 46 is started at a timing t5 in FIG. 6. The booklet Ps is transported in the −Y direction, the step G enters between the upper reading sensor 20A and the lower reading sensor 20B at a timing t6, and an absolute value of the duty cycle exceeds the first threshold value Sh1 at a timing t7. Next, at a timing t8, the step G of the booklet Ps comes out from between the upper reading sensor 20A and the lower reading sensor 20B.

In this case, the image disturbance area Ae2 (refer to FIG. 8) in the second reading operation occurs in a predetermined period after the timing t6 at which the duty cycle starts to increase. Here, the predetermined period can be obtained through an experiment in advance and can be stored in a storage unit such as the memory 43 (refer to FIG. 3) and read, as described above. As an example, the image disturbance area Ae2 may be an image datum from the timing t6 as a starting point to a time when a predetermined time elapses.

Therefore, a position and size of the image disturbance area Ae2 in the image area Ds2 (refer to FIG. 8) can be ascertained based on the position (a position in the document transport path T) and size of the booklet Ps ascertained from the detection information of the second document detection unit 32 (refer to FIG. 2) and the driving amount of the transport motor 46, and the change in the duty cycle.

As described above, the control unit 40 can determine the first area and the second area based on a timing at which the duty cycle exceeds the first threshold value Sh1, and appropriately exclude a range in which the image disturbance occurs in this case.

Next, a determination example in step S103 in FIG. 5 will be described.

As described above, the duty cycle when the transport motor 46 is driven increases when the step G of the booklet Ps enters between the upper reading sensor 20A and the lower reading sensor 20B. In the above-described example, the first threshold value Sh1 that is a threshold value of the duty cycle is set, and in step S103, when the duty cycle exceeds the first threshold value Sh1, it is possible to determine that the image correction control needs to be executed.

Thus, when the image correction control is executed by using the duty cycle which is an example of the load value indicating the load of the transport motor 46, it is possible to detect the occurrence of the image disturbance using an existing means, and to curb a cost increase of the device.

Further, the determination in step S103 in FIG. 5 can also be made using the first document detection unit 31. As described above, in the present embodiment, the first document detection unit 31 is an optical sensor including the light emission unit 31a and the light reception unit 31b.

Figure 10:
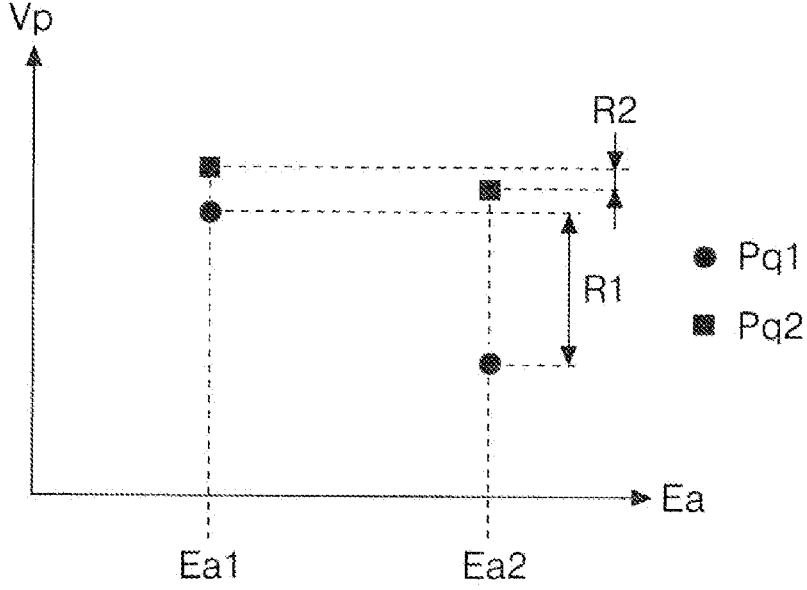
FIG. 10 is a plot diagram illustrating a relationship between a light emission intensity of detection light and a light reception voltage.

The emission intensity of the detection light from the light emission unit 31a can be changed under the control of the control unit 40. In FIG. 10, a horizontal axis Ea indicates light emission intensity of the detection light from the light emission unit 31a, and a vertical axis Vp indicates a light reception voltage based the intensity of the detection light received by the light reception unit 31b.

A plot indicated by a circle corresponds to a case of a first portion Pq1 of the document P, and a plot indicated by a square corresponds to a case of a second portion Pq2 of the document P. A thickness of the second portion Pq2 is greater than that of the first portion Pq1. Further, a light emission intensity Ea2 is higher than a light emission intensity Ea1.

As illustrated in the drawing, change in a light reception voltage Vp when the light emission intensity Ea increases tends to be larger at the first portion Pq1 than at the second portion Pq2.

In the present embodiment, the determination of the step S103 is performed by using such a property.

Figure 11:
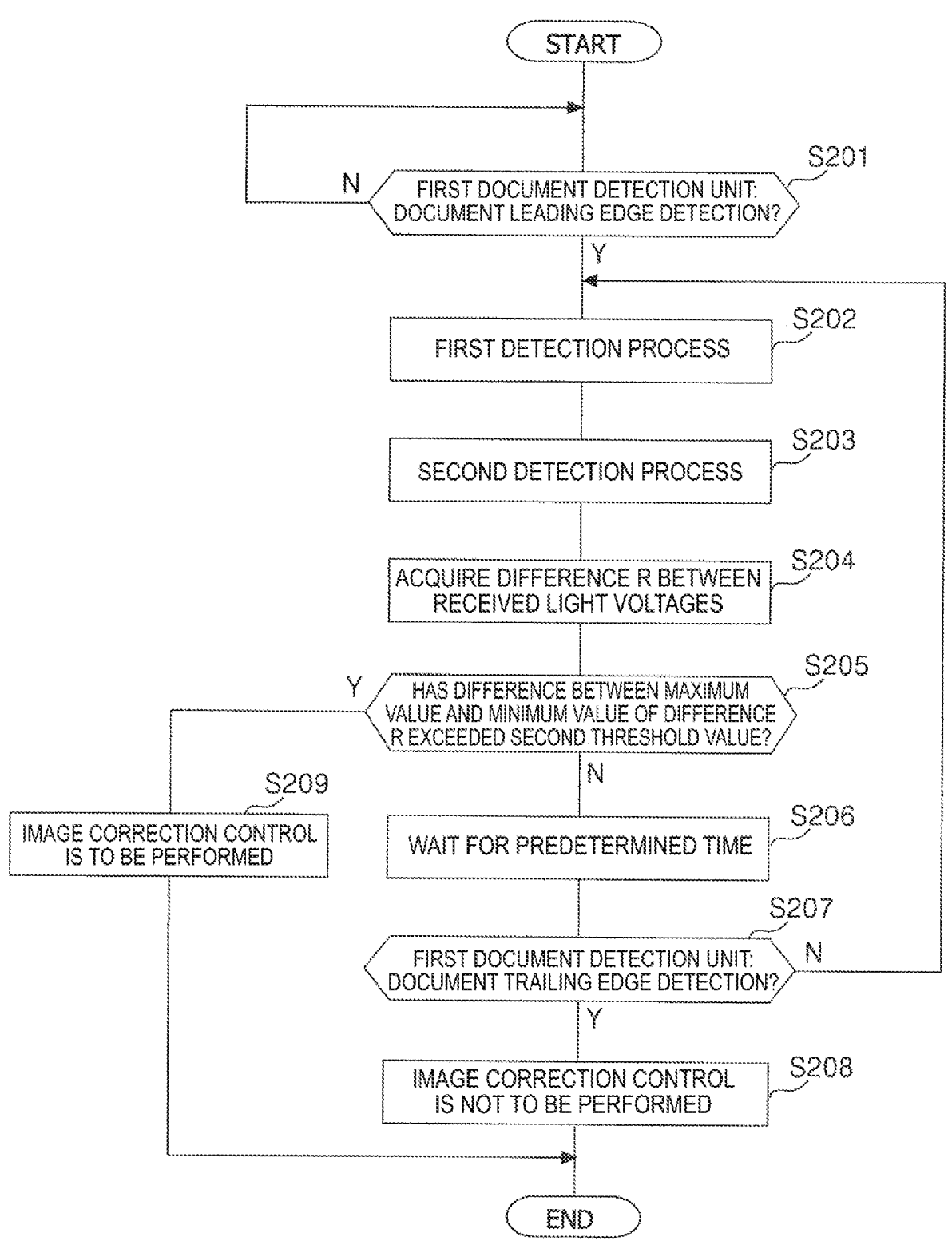
FIG. 11 is a flowchart showing a flow of a process when determining whether or not to execute image correction control using a first medium detection unit.

Specifically, the control unit 40 performs the process illustrated in FIG. 11 in step S103 of FIG. 5. First, when the first document detection unit 31 detects the leading edge of the document (Yes in step S201), first detection process is performed to detect the light reception voltage in the light reception unit 31b when the light emission intensity in the light emission unit 31a is set to a first intensity Ea1 (step S202). Next, a second detection process is executed to detect a light reception voltage at the light reception unit 31b when the light emission intensity at the light emission unit 31a is set to a second intensity Ea2 higher than the first intensity Ea1 (step S203). A difference R between the light reception voltage in the first detection process and the light reception voltage in the second detection process is acquired (step S204).

The control unit 40 stores the acquired difference R, updates a difference between a maximum value and a minimum value of the difference R each time the difference R is acquired, and determines that the document has a portion having a large thickness change and the image correction control is to be performed when the difference between a maximum value and a minimum value of the difference R exceeds a second threshold (Yes in step S205) (step S209). The difference R between the light reception voltage in the first detection process and the light reception intensity in the second detection process is indicated by R1 and R2 in FIG. 10 as an example.

When the difference between a maximum value and a minimum value of the difference R does not exceed the second threshold value (No in step S205), waiting for a predetermined time is performed (step S206), and when the first document detection unit 31 does not detect a rear end of the document (No in step S207), step S202 and subsequent steps are performed again. When the first document detection unit 31 detects the rear end of the document (Yes in step S207), no image correction control is to be performed (step S208).

As described above, since a determination is made as to whether or not the image correction control needs to be performed by using the first document detection unit 31 which is an existing component, it is not necessary to provide a dedicated detection means for determining whether or not the image correction control needs to be performed, and it is possible to curb an increase in cost of the device.

Since the document thickness can be ascertained by changing the intensity of the detection light in the first document detection unit 31 as described above, the ascertained document thickness may be used for other control. As an example, when the process for determining occurrence of a jam based on the fact that the duty cycle described above exceeds the jam threshold value is performed, the jam threshold value may be switched according to the ascertained document thickness.

Figure 12:
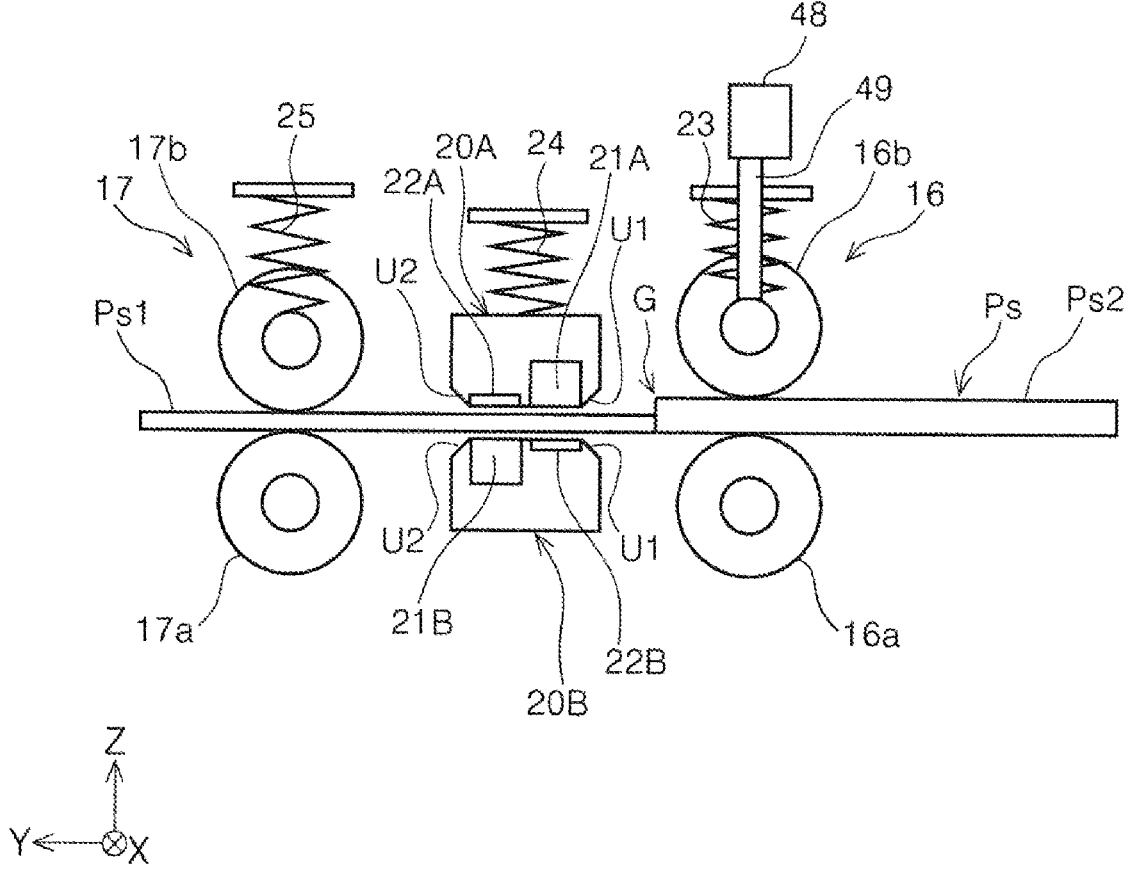
FIG. 12 is a diagram illustrating a configuration including a displacement detection unit that detects displacement of an upper first roller.

Further, the determination in step S103 in FIG. 5 can be performed by detecting the displacement of the upper first roller 16b, which is an example of a displacement roller. In FIG. 12, a reference sign 49 denotes a detected portion that is displaced together with the upper first roller 16b, and a reference sign 48 denotes a displacement detection unit that detects a displacement of the detected portion 49. The detected portion 49 is, for example, a linear scale, and the displacement detection unit 48 is, for example, an encoder that detects the linear scale.

Figure 13:
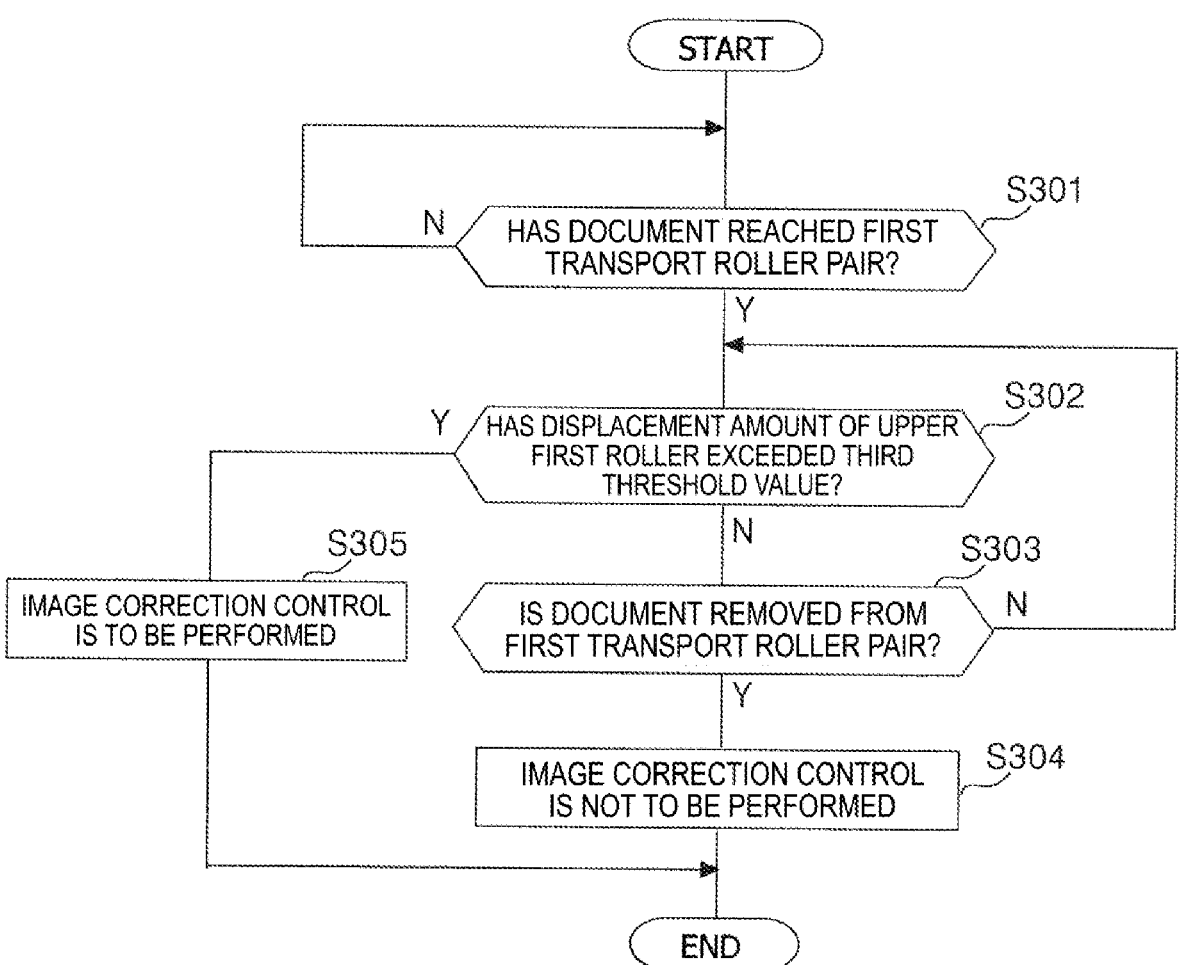
FIG. 13 is a flowchart showing a flow of a process when determining whether or not to execute image correction control using a displacement detection unit.

Control performed by the control unit 40 in this case will be described with reference to FIG. 13. The control unit 40 monitors whether the document P has reached the first transport roller pair 16 based on, for example, the detection information of the second document detection unit 32 (refer to FIG. 2) (step S301), and the control unit 40 determines whether a displacement amount of the upper first roller exceeds a third threshold value based on detection information of the displacement detection unit 48 when the document P has reached the first transport roller pair 16 (Yes in step S301) (step S302).

As a result, when the displacement amount of the upper first roller exceeds the third threshold value (Yes in Step S302), a determination is made that the document P includes a portion having a large thickness change, and the image correction control is to be performed (step S305).

When the displacement amount of the upper first roller does not exceed the third threshold value and the document P is removed from the first transport roller pair 16 (No in Step S302 and Yes in Step S303), the image correction control is not performed (step S304).

Thus, the control unit 40 can determine that the image correction control is to be performed when an amount of change in an interval between the upper first roller 16b and the lower first roller 16a exceeds the third threshold value based on the detection information of the displacement detection unit 48. Thus, it is possible to accurately determine whether or not the image correction control needs to be performed.

In the present embodiment, since the document thickness can be ascertained based on the detection information of the displacement detection unit 48, the ascertained document thickness may be used for other control. As an example, when the process for determining occurrence of a jam based on the fact that the duty cycle described above exceeds the jam threshold value is performed, the jam threshold value may be switched according to the ascertained document thickness.

Further, the determination in step S103 in FIG. 5 can also be performed by reading background plate 22B using the upper reading sensor 20A.

Although illustration is omitted, the upper reading sensor 20A and the background plate 22B extend to a position further outside the document of the maximum size in a width direction (X-axis direction), and the upper reading sensor 20A can also read the background plate 22B during reading of the document.

Here, when there are a first portion of the document whose thickness is a first thickness and a second portion of the document whose thickness is greater than the first thickness, luminance when the background plate 22B is read differs between when the first portion passes and when the second portion passes. Therefore, when the change in luminance is large, it can be said that the document P having a large change in thickness has passed through the upper reading sensor 20A, and there is high concern that image disturbance occurs. This property is utilized in the present embodiment.

Figure 14:
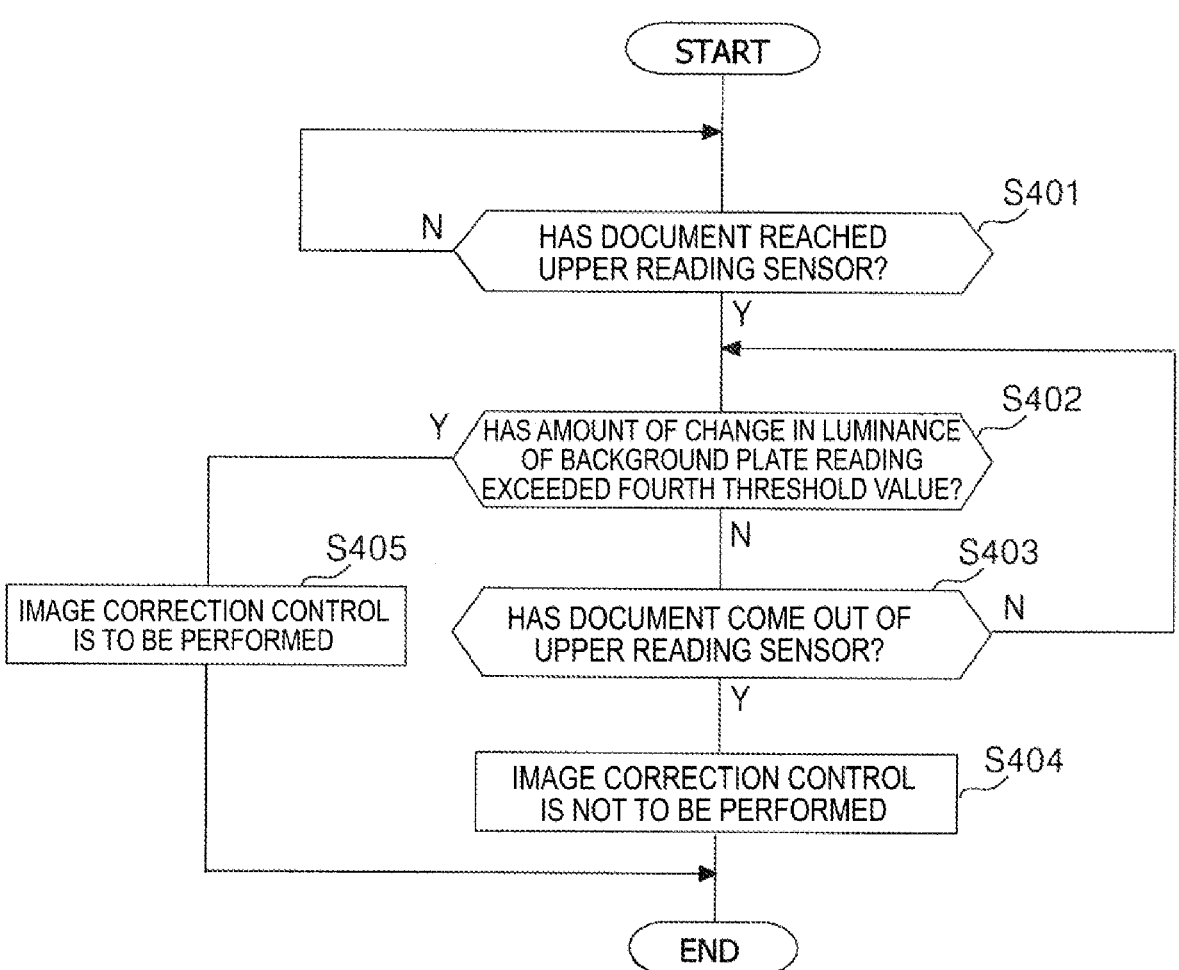
FIG. 14 is a flowchart showing a flow of a process when determining whether or not to execute image correction control using a background plate.

Control performed by the control unit 40 in this case will be described with reference to FIG. 14. The control unit 40 monitors whether the document P has reached the upper reading sensor 20A based on, for example, detection information of the second document detection unit 32 (refer to FIG. 2) (step S401), and monitors whether the amount of change in luminance when the background plate 22B is read by the upper reading sensor 20A exceeds a fourth threshold value when the document has reached the upper reading sensor 20A (Yes in Step S401) (step S402).

As a result, when the amount of change in luminance when the background plate 22B is read exceeds the fourth threshold value (Yes in Step S402), a determination is made that the document P includes a portion having a large thickness change, and the image correction control is to be performed (step S405).

When the amount of change in luminance when the background plate 22B is read does not exceed the fourth threshold value and the document P is removed from the upper reading sensor 20A (No in step S402 and Yes in step S403), the image correction control is not performed (step S404).

Thus, the control unit 40 reads the background plate 22B during the execution of the first reading operation, and executes the image correction control when the amount of change in luminance exceeds the fourth threshold value, and thus, it is not necessary to provide a dedicated detection means for determining whether or not the image correction control needs to be executed, and it is possible to curb an increase in cost of the device.

Further, the determination in step S103 in FIG. 5 can be made based on the document type when the control unit 40 acquires information on the document type. For example, a user interface capable of setting the type of the document P can be displayed on the operation panel 7, and the user can set the type of the document P via the operation panel 7. The type of the document P includes a booklet. When the type of the document P is the booklet, the control unit 40 executes the image correction control.

In this case, it is possible to reliably execute the image correction control when reading a booklet in which image correction control is highly required.

The type of the document P is not limited to the operation panel 7 included in the scanner 1 and may be set via a driver operating in the external computer 100.

Further, the determination in step S103 in FIG. 5 can be made based on a user instruction. As an example, the control unit 40 can execute a preview mode in which the transport of the document P is temporarily stopped and the image of the document P read through the first reading operation is displayed on the operation panel 7 after the control unit 40 executes the first reading operation.

Figure 15:
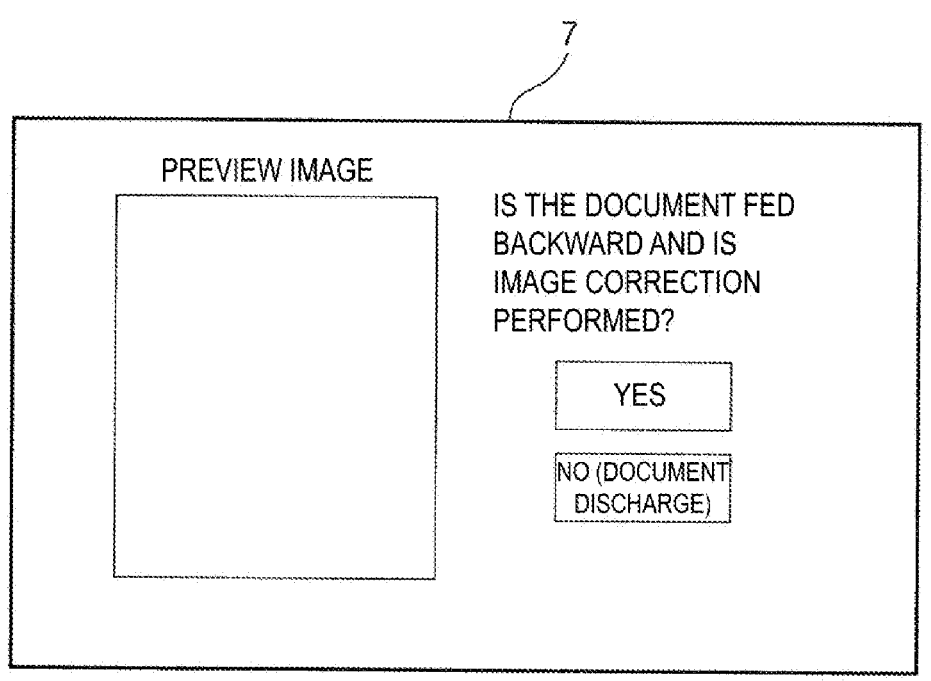
FIG. 15 is a diagram illustrating an example of a user interface displayed in a preview mode.

FIG. 15 illustrates an example of a user interface displayed on the operation panel 7 in the preview mode, and the image of the document P read through the first reading operation (an image read by the upper reading sensor 20A) is displayed as a preview image. A button for selecting "YES" and "NO (document discharge)" is displayed together with a message "Is the document fed backward and is image correction performed?". The user selects "NO (document discharge)" when a reading result indicates good based on the preview image. In this case, the control unit 40 discharges the document P as it is without performing the image correction control.

The user selects "YES" when the reading result indicates bad based on the preview image. In this case, the control unit 40 performs image correction control.

Thus, in the preview mode, the control unit 40 causes the operation panel 7 to display the user interface allowing the user to select whether to discharge the document or perform the image correction control, and thus the user can select whether to perform the image correction control, and it is possible to improve usability.

The user interface is not limited to the operation panel 7 included in the scanner 1 and may be displayed on a display unit included in the external computer 100.

Next, other means for curbing image disturbance will be described.

First, in the present embodiment, both of the two rollers constituting the first transport roller pair 16 are driven by the transport motor 46, and both of the two rollers constituting the second transport roller pair 17 are also driven by the transport motor 46. This makes it possible to improve the ability to transport the document and curb a disturbance in the read image due to deterioration in transport accuracy.

However, a configuration in which two rollers constituting any one of the first transport roller pair 16 and the second transport roller pair 17 are driven may be adopted, or a configuration in which only one of two rollers constituting the roller pair is driven in both the first transport roller pair 16 and the second transport roller pair 17 may be adopted.

Further, as illustrated in FIG. 16, the upper first roller 16*b* as the displacement roller and the upper reading sensor 20A may be engaged with each other.

Figure 16A:
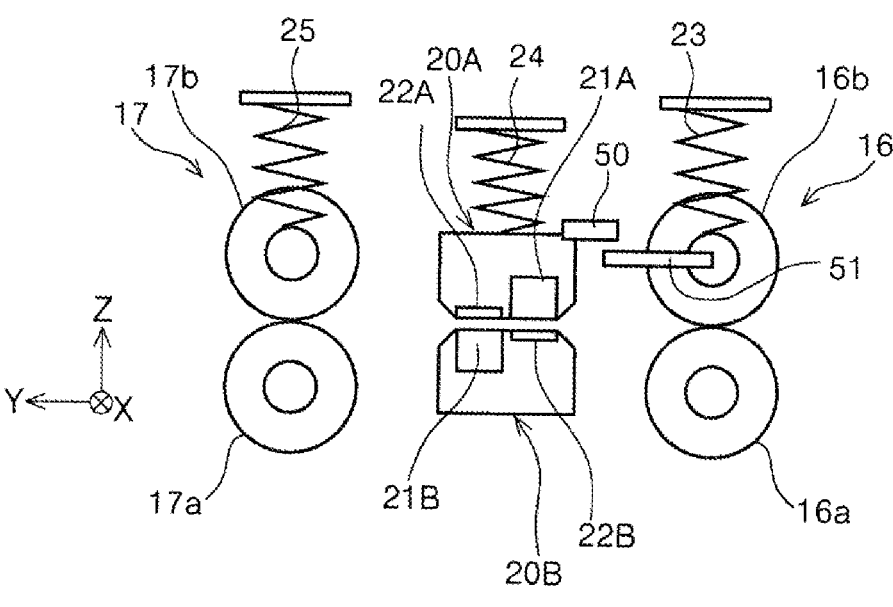
FIGS. 16A and 16B are diagrams illustrating a configuration in which an engagement portion that engages with the upper reading sensor is provided in the upper first roller.
Figure 16B:
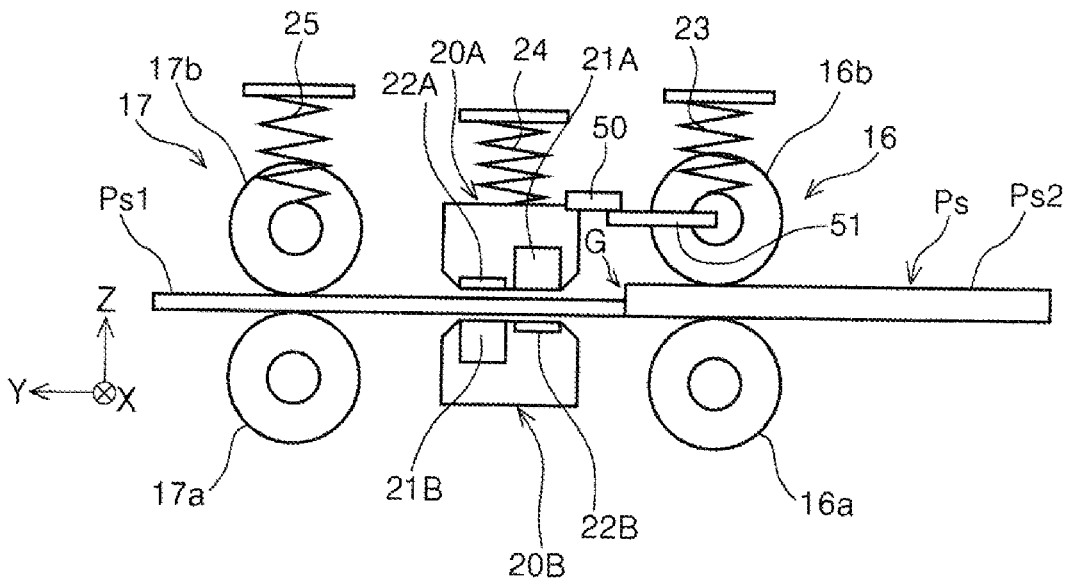

In FIG. 16, the upper reading sensor 20A is provided with an engaged portion 50. The upper first roller 16*b* is provided with an engaging portion 51 which is a portion displaced integrally with the upper first roller 16*b* and is engageable with the engaged portion 50. As shown in the change from FIG. 16A to FIG. 16B, when the upper first roller 16*b* is separated from the lower first roller 16*a* by a predetermined amount or more, the engaging portion 51 comes into contact with the engaged portion 50 and displaces the upper reading sensor 20A together with the upper first roller 16*b*.

According to such a configuration, when the document P passes through the upper reading sensor 20A, a clearance through which the document P passes becomes large, and thus, it is possible to curb a disturbance in the read image caused by the violent movement of the upper reading sensor 20A.

Figure 17A:
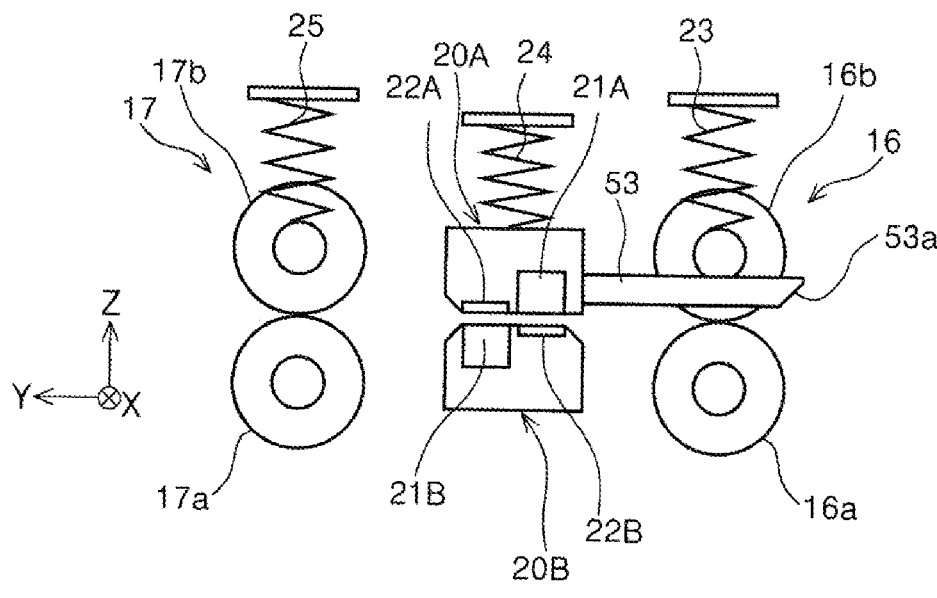
FIGS. 17A and 17B are diagrams illustrating a configuration in which a guide portion is provided in the upper reading sensor.
Figure 17B:
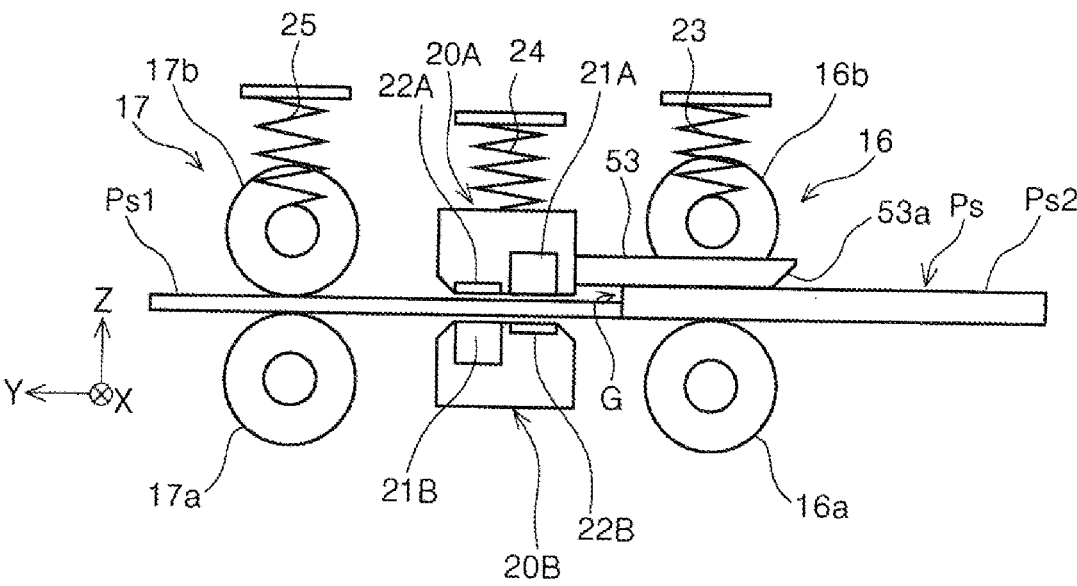

Further, a guide portion 53 that guides the document P transported in the +Y direction, to a position facing the upper reading sensor 20A may be provided in the −Y direction with respect to the upper reading sensor 20A as illustrated in FIG. 17. The guide portion 53 is displaceable in a direction of moving toward and away from the document transport path T, and is provided integrally with the upper reading sensor 20A. A guide surface 53*a* that guides the document P to the lower side of the guide portion 53 is formed at an end portion of the guide portion 53 in the −Y direction.

According to such a configuration, when the document P passes through the upper reading sensor 20A, the clearance through which the document P passes becomes large, and thus it is possible to curb a disturbance in the read image caused by the violent movement of the upper reading sensor 20A.

The present disclosure is not limited to the aforementioned embodiment, many variations are possible within the scope of the present disclosure as described in the appended claims, and it goes without saying that such variations also fall within the scope of the present disclosure.

For example, although the document P is transported in the +Y direction in the first reading operation and the document P is transported in the −Y direction in the second reading operation in the above-described embodiment, the document P may be transported in the −Y direction in the first reading operation and the document P may be transported in the +Y direction in the second reading operation. Further, the document P is not limited to a form in which the document P is fed in the +Y direction from the document placement portion 11 and discharged in the +Y direction from the discharge port 18, and may be fed in the −Y direction from the discharge port 18 and then discharged in the +Y direction from the discharge port 18.

Further, for example, although the image correction control (steps S104 to S106 in FIG. 5) is performed by the control unit 40 in the above-described embodiment, at least a part of the image correction control may be executed by a program such as a scanner driver or an application program operating in the external computer 100. For example, the control unit 40 may transmit image data (image data before image correction) to the external computer 100, and a program such as the scanner driver or the application program operating in the external computer 100 may perform a combination process of step S106 on the image data acquired from the scanner 1. As another example, the control unit 40 may transmit the image data (image data before image correction) acquired in steps S102 and S105 between steps S105 and S106 illustrated in FIG. 5 to the external computer 100, the external computer 100 may execute only step S106 among the steps illustrated in FIG. 5, and the control unit 40 may execute the other steps. Further, in this case, the corrected image data may be transmitted from the external computer 100 to the control unit 40.

What is claimed is:

1. An image reading device comprising:
a first transport roller pair configured to transport a medium along a transport path for transporting the medium;
a second transport roller pair located in a first direction with respect to the first transport roller pair on the transport path and configured to transport the medium;
a reading sensor located between the first transport roller pair and the second transport roller pair on the transport path and configured to read an image of the medium;
a controller configured to control the first transport roller pair, the second transport roller pair, and the reading sensor; and
a medium detector configured to detect a medium in the second direction with respect to the first transport roller pair in the transport path, wherein
the reading sensor is configured to be displaced toward and away from the transport path and is pressed toward the transport path,
the controller is configured to execute image correction control after performing a first reading operation of reading the medium while transporting the medium in the first direction, and
the image correction control includes a second reading operation of reading the medium while transporting the medium in a second direction opposite to the first direction,
a combination process of combining a first area that is a part of image data acquired through the first reading operation with a second area that is a part of image data acquired through the second reading operation, to acquire image data of one page, the medium detector is an optical sensor including a light emitter and a light receiver, the controller is configured to execute a first detection process of detecting a light reception intensity in the light receiver when a light emission intensity of the detection light in the light emitter is set as a first intensity; and a second detection process of detecting a light reception intensity in the light receiver when the light emission intensity of the detection light in the light emitter is set to a second intensity higher than the first intensity, and the controller further acquires a difference R between a light reception intensity in the light receiver in the first detection process and a light reception intensity in the light receiver in the second detection process, and executes the image correction control when a difference between a maximum value and a minimum value of the difference R exceeds a threshold value.

2. The image reading device according to claim 1, wherein the two rollers constituting the first transport roller pair are both driven by a drive source, and the two rollers constituting the second transport roller pair are both driven by the drive source.

3. The image reading device according to claim 1, wherein one of the two rollers constituting the first transport roller pair that is on the same side as the reading sensor with respect to the transport path is a displacement roller configured to move toward and away from the other roller, the displacement roller is provided with an engagement portion, the engagement portion being a portion displaced integrally with the displacement roller and being configured to engage with the reading sensor, and when the displacement roller is separated from the other roller, the engaging portion displaces the reading sensor together with the displacement roller.

4. The image reading device according to claim 1, further comprising:

a guide portion in the second direction with respect to the reading sensor on the transport path, the guide portion being configured to guide the medium transported in the first direction to a position facing the reading sensor, wherein the guide portion is configured to be displaced toward and away from the transport path, and is provided integrally with the reading sensor.

5. A control method for an image reading device including a first transport roller pair configured to transport a medium along a transport path for transporting the medium, a second transport roller pair located in a first direction with respect to the first transport roller pair on the transport path and configured to transport the medium, a reading sensor located between the first transport roller pair and the second transport roller pair on the transport path and configured to read an image of the medium, the reading sensor being configured to be displaced toward and away from the transport path and being pressed toward the transport path, and a medium detector configured to detect a medium in the second direction with respect to the first transport roller pair in the transport path, the medium detector is an optical sensor including a light emitter and a light receiver, the method comprising:

a first reading operation of reading the medium while transporting the medium in the first direction, a second reading operation of reading the medium while transporting the medium in a second direction opposite to the first direction, a combination process of combining a first area that is a part of image data acquired through the first reading operation with a second area that is a part of image data acquired through the second reading operation, to acquire image data of one page, a first detection process of detecting a light reception intensity in the light receiver when a light emission intensity of the detection light in the light emitter is set as a first intensity;

a second detection process of detecting a light reception intensity in the light receiver when the light emission intensity of the detection light in the light emitter is set to a second intensity higher than the first intensity, acquiring a difference R between a light reception intensity in the light receiver in the first detection process and a light reception intensity in the light receiver in the second detection process, and executing the image correction control when a difference between a maximum value and a minimum value of the difference R exceeds a threshold value.

6. An image reading device comprising:

a first transport roller pair configured to transport a medium along a transport path for transporting the medium;

a second transport roller pair located in a first direction with respect to the first transport roller pair on the transport path and configured to transport the medium;

a reading sensor located between the first transport roller pair and the second transport roller pair on the transport path and configured to read an image of the medium; and a controller configured to control the first transport roller pair, the second transport roller pair, and the reading sensor; and a background plate serving as a portion read by the reading sensor at a position facing the reading sensor and being used for shading correction, wherein the reading sensor is configured to be displaced toward and away from the transport path and is pressed toward the transport path, the controller is configured to execute image correction control after performing a first reading operation of reading the medium while transporting the medium in the first direction, and the image correction control includes a second reading operation of reading the medium while transporting the medium in a second direction opposite to the first direction, a combination process of combining a first area that is a part of image data acquired through the first reading operation with a second area that is a part of image data acquired through the second reading operation, to acquire image data of one page, the reading sensor and the background plate extend further outside than a medium having a maximum size in a width direction intersecting a transport direction of the medium, and the controller reads the background plate during execution of the first reading operation, and executes the image correction control when an amount of change in luminance exceeds a threshold value.

7. The image reading device according to claim 6, wherein the two rollers constituting the first transport roller pair are both driven by a drive source, and the two rollers constituting the second transport roller pair are both driven by the drive source.

8. The image reading device according to claim 6, wherein one of the two rollers constituting the first transport roller pair that is on the same side as the reading sensor with respect to the transport path is a displacement roller configured to move toward and away from the other roller, the displacement roller is provided with an engagement portion, the engagement portion being a portion displaced integrally with the displacement roller and being configured to engage with the reading sensor, and when the displacement roller is separated from the other roller, the engaging portion displaces the reading sensor together with the displacement roller.

9. The image reading device according to claim 6, further comprising:

a guide portion in the second direction with respect to the reading sensor on the transport path, the guide portion being configured to guide the medium transported in the first direction to a position facing the reading sensor, wherein the guide portion is configured to be displaced toward and away from the transport path, and is provided integrally with the reading sensor.

10. An image reading device comprising:

a first transport roller pair configured to transport a medium along a transport path for transporting the medium;

a second transport roller pair located in a first direction with respect to the first transport roller pair on the transport path and configured to transport the medium;

a reading sensor located between the first transport roller pair and the second transport roller pair on the transport path and configured to read an image of the medium; and a controller configured to control the first transport roller pair, the second transport roller pair, and the reading sensor, wherein the reading sensor is configured to be displaced toward and away from the transport path and is pressed toward the transport path, the controller is configured to execute image correction control after performing a first reading operation of reading the medium while transporting the medium in the first direction, the first reading operation acquiring first image data including a first image disturbance area caused by a movement of the reading sensor, and the image correction control includes a second reading operation of reading the medium while transporting the medium in a second direction opposite to the first direction, the second reading operation acquiring second image data including a second image disturbance area caused by a movement of the reading sensor, and a combination process of combining a first area that is a part of the first image data acquired through the first reading operation with a second area that is a part of the second image data acquired through the second reading operation, to acquire image data of one page, the combination process removing the first and second image disturbance areas from the image data of the one page.

11. The image reading device according to claim 10, further comprising:

a DC motor that is a driving source of the first transport roller pair and the second transport roller pair, wherein the controller executes the image correction control when a load value indicating a load of the DC motor exceeds a threshold value during execution of the first reading operation.

12. The image reading device according to claim 11, wherein the controller determines the first area and the second area based on a timing at which the load value exceeds a threshold value.

13. The image reading device according to claim 10, further comprising:

a medium detector configured to detect a medium in the second direction with respect to the first transport roller pair in the transport path, wherein the medium detector is an optical sensor including a light emitter and a light receiver, the controller is configured to execute a first detection process of detecting a light reception intensity in the light receiver when a light emission intensity of the detection light in the light emitter is set as a first intensity; and a second detection process of detecting a light reception intensity in the light receiver when the light emission intensity of the detection light in the light emitter is set to a second intensity higher than the first intensity, and the controller further acquires a difference R between a light reception intensity in the light receiver in the first detection process and a light reception intensity in the light receiver in the second detection process, and executes the image correction control when a difference between a maximum value and a minimum value of the difference R exceeds a threshold value.

14. The image reading device according to claim 10, wherein one of the two rollers constituting the first transport roller pair is a displacement roller configured to move toward and away from the other roller, the image reading device comprises a displacement detector configured to detect a displacement of the displacement roller, and the controller executes the image correction control when a displacement amount of the displacement roller exceeds a threshold value based on detection information of the displacement detector.

15. The image reading device according to claim 10, further comprising:

a background plate serving as a portion read by the reading sensor at a position facing the reading sensor and being used for shading correction, wherein the reading sensor and the background plate extend further outside than a medium having a maximum size in a width direction intersecting a transport direction of the medium, and the controller reads the background plate during execution of the first reading operation, and executes the image correction control when an amount of change in luminance exceeds a threshold value.

16. The image reading device according to claim 10, wherein the controller is configured to acquire information on a type of medium, types of the medium include a booklet, and the controller executes the image correction control when the type of the medium is a booklet.

17. The image reading device according to claim 10, further comprising:

a display panel configured to display an image, wherein the controller is configured to execute a preview mode in which transport of the medium is temporarily stopped and an image of the medium read through the first reading operation is displayed on the display panel after execution of the first reading operation, and the controller, in the preview mode, further causes the display panel to display a user interface allowing a user to select whether to discharge the medium or to perform the image correction control.

18. The image reading device according to claim 10, wherein the two rollers constituting the first transport roller pair are both driven by a drive source, and the two rollers constituting the second transport roller pair are both driven by the drive source.

19. The image reading device according to claim 10, wherein one of the two rollers constituting the first transport roller pair that is on the same side as the reading sensor with respect to the transport path is a displacement roller configured to move toward and away from the other roller, the displacement roller is provided with an engagement portion, the engagement portion being a portion displaced integrally with the displacement roller and being configured to engage with the reading sensor, and when the displacement roller is separated from the other roller, the engaging portion displaces the reading sensor together with the displacement roller.

20. The image reading device according to claim 10, further comprising:

a guide portion in the second direction with respect to the reading sensor on the transport path, the guide portion being configured to guide the medium transported in the first direction to a position facing the reading sensor, wherein the guide portion is configured to be displaced toward and away from the transport path, and is provided integrally with the reading sensor.

* * * * *